US00RE50531E

(19) United States
(12) Reissued Patent
Mancevska et al.

(10) Patent Number: US RE50,531 E
(45) Date of Reissued Patent: Aug. 12, 2025

(54) METHOD AND TELECOMMUNICATIONS NODE FOR CONTROLLING AN ATTACH STATE OF A USER EQUIPMENT

(71) Applicant: Koninklijke KPN N.V., Rotterdam (NL)

(72) Inventors: Elena Mancevska, Voorburg (NL); Maurice Hiep, Wassenaar (NL); Annemieke Kips, Leiden (NL)

(73) Assignee: KONINKLIJKE KPN N.V., Rotterdam (NL)

(21) Appl. No.: 18/222,212

(22) Filed: Jul. 14, 2023

Related U.S. Patent Documents

Reissue of:
(64) Patent No.: 9,549,426
Issued: Jan. 17, 2017
Appl. No.: 14/905,143
PCT Filed: Jul. 15, 2014
PCT No.: PCT/EP2014/065071
§ 371 (c)(1),
(2) Date: Jan. 14, 2016
PCT Pub. No.: WO2015/007699
PCT Pub. Date: Jan. 22, 2015

(30) Foreign Application Priority Data

Jul. 15, 2013 (EP) ..... 13176452

(51) Int. Cl.
*H04W 4/00* (2018.01)
*H04W 4/12* (2009.01)
(Continued)

(52) U.S. Cl.
CPC ..... *H04W 76/12* (2018.02); *H04W 4/12* (2013.01); *H04W 4/70* (2018.02); *H04W 8/12* (2013.01); *H04W 8/18* (2013.01); *H04W 12/062* (2021.01)

(58) Field of Classification Search
CPC ..... H04W 8/12; H04W 4/70; H04W 76/12; H04W 12/062; H04W 8/18; H04W 4/12
See application file for complete search history.

(56) References Cited

U.S. PATENT DOCUMENTS 6,879,825 B1 4/2005 Daly
9,549,426 B2 1/2017 Mancevska et al.
(Continued)

FOREIGN PATENT DOCUMENTS

CN 1328925 1/2002
EP 1 065 904 A1 1/2001
(Continued)

OTHER PUBLICATIONS

Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release (Sep. 25, 2012).
(Continued)

*Primary Examiner* — Ovidio Escalante
(74) *Attorney, Agent, or Firm* — Hamilton, Brook, Smith & Reynolds, P.C.

(57) ABSTRACT

The invention relates to a method and telecommunications node for controlling an attach state of a user equipment in an attach control node of a telecommunications system further comprising a subscriber database containing subscription data of the user equipment. The method comprises receiving authentication data in the attach control node if an authentication step is required. Following the authentication step, if any, receiving in a first transfer stage a first set of subscription data from the subscriber database and storing the first set of subscription data in the attach control node, wherein the first set of subscription data is insufficient for enabling establishing a communication session between the user equipment and the telecommunications system. If
(Continued)

establishing a communication session is required between the user equipment and the telecommunications network, receiving in a second transfer stage following the first transfer stage a second set of subscription data from the subscriber database in the attach control node, and storing the second set of subscription data in the attach control node, wherein the combination of the first set of subscription data and the second set of subscription data is sufficient for enabling establishing a communication session between the user equipment and the telecommunications network.

14 Claims, 24 Drawing Sheets

(51) Int. Cl.

| | |
|---|---|
| ***H04W 4/70*** | (2018.01) |
| ***H04W 8/12*** | (2009.01) |
| ***H04W 8/18*** | (2009.01) |
| ***H04W 12/06*** | (2021.01) |
| ***H04W 12/062*** | (2021.01) |
| ***H04W 76/12*** | (2018.01) |

(56) References Cited

U.S. PATENT DOCUMENTS

| | | | | |
|---|---|---|---|---|
| 9,750,065 | B2 | 8/2017 | Mancevska | |
| 9,907,101 | B2 | 2/2018 | Mancevska | |
| 2008/0014930 | A1 | 1/2008 | Jokinen et al. | |
| 2012/0155391 | A1 | 6/2012 | Kim et al. | |
| 2012/0188980 | A1* | 7/2012 | Wang | H04W 36/0033 370/331 |
| 2012/0209978 | A1 | 8/2012 | Cho et al. | |
| 2012/0269167 | A1 | 10/2012 | Velev et al. | |
| 2013/0083765 | A1* | 4/2013 | Ai | H04W 4/005 370/329 |
| 2013/0183971 | A1* | 7/2013 | Tamaki | H04W 36/08 455/436 |
| 2013/0227138 | A1 | 8/2013 | Cai et al. | |
| 2016/0150578 | A1 | 5/2016 | Mancevska et al. | |
| 2017/0086236 | A1 | 3/2017 | Mancevska et al. | |
| 2017/0359845 | A1 | 12/2017 | Mancevska et al. | |

FOREIGN PATENT DOCUMENTS

| | | | |
|---|---|---|---|
| EP | 2 566 199 | A1 | 3/2013 |
| EP | 2568761 | A1 | 3/2013 |
| WO | 2007/076881 | A1 | 7/2007 |
| WO | WO 2012107485 | A1 | 8/2012 |

OTHER PUBLICATIONS

3rd Generation Partnership Project; Technical Specification Group Services and System Aspects; System Improvements for Machine-Type Communications (Release 11); 3GPP TR 23.888 V2.0.0 (Aug. 2012).

Digital cellular telecommunications system (Phase 2+); Universal Mobile Telecommunications System (UMTS); LTE; Organization of subscriber data (3GPP TS 23.008 V11.6.0 (Release 11) (Jan. 16, 2013).

Digital cellular telecommunications system (Phase 2+); Universal Mobile Telecommunications System (UMTS); General Packet Radio Service (GPRS); Service description; Stage 2 (3GPP TS 23.060 V11.3.0 (Release 11); Nov. 14, 2012.

3rd Generation Partnership Project; Technical Specification Group Services and System Aspects; General Packet Radio Service (GPRS) enhancements for Evolved Universal Terrestrial Radio Access Network (E-UTRAN) access (Release 12); 3GPP TS 23.401 V12.0.0 (Mar. 2013).

Universal Mobile Telecommunications System (UMTS); LTE; Architecture enhancements for non-3GPP accesses 3GPP TS 23.402 V11.5.1 (Release 11 ) (Feb. 15, 2013).

Digital cellular telecommunications system (Phase 2+); Universal Mobile Telecommunications System (UMTS); LTE; Network architecture (3GPP TS 23.002 V11 .5.0 (Release 11 ) (Jan. 10, 2013).

Digital cellular telecommunications system (Phase 2+); Universal Mobile Telecommunications System (UMTS); Mobile Application Part (MAP) specification (3GPP TS 29.002 V11.5.0 (Release 11) (Jan. 28, 2013).

Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V11.5.0 (Release 11) (Jan. 29, 2013).

3rd Generation Partnership Project; Technical Specification Group Core Network and Terminals; Mobile radio interface Layer 3 specification; Core network protocols; Stage 3 (Release 12); 3GPP TS 24.008 V12.2.0 (Jun. 2013).

Digital cellular telecommunications system (Phase 2+); Universal Mobile Telecommunications System (UMTS); Numbering, addressing and identification (3GPP TS 23.003 V10.6.0 (Release 10) (Jan. 16, 2013).

3rd Generation Partnership Project; Technical Specification Group Core Network; Technical report on Super-Charger (Release 1999); 3GPP TR 23.912 V3.1.0 (Dec. 2001).

3rd Generation Partnership Project, Technical Specification Group Core Network and Terminals; Organization of subscriber data (3GPP TS 23.008 V7.8.0 (Release 7) (Dec. 2007).

3rd Generation Partnership Project; Technical Specification Group Services and System Aspects; General Packet Radio Service (GPRS) enhancements for Evolved Universal Terrestrial Radio Access Network (E-UTRAN) access (Release 11); 3GPP TS 23.401 V11.0.0 (Dec. 2011).

Bannister, J., et al., "Convergence Technologies for 3G Networks," John Wiley & Sons, (2004).

Sälzer, Thomas, et al., "LTE, The UMTS Long Term Evolution," John Wiley & Sons (2011).

ZTE: "Update HSS based trigger solution", 3GPP Draft; S2-112328, 3rd Generation Partnership Project (3GPP), Mobile Competence Centre ; 650, Route Des Lucioles ; F-06921 Sophia-Antipolis Cedex ; France, vol. SA WG2, No. Xi'An; May 16, 2011, (May 11, 2011).

*Koninklijke KPN N.V.,* v. *Telefonaktiebolaget LM Ericsson, Ericsson Inc.*—In The United States District Court for The Eastern District of Texas Marshall Division, Civil Action No. 2:21-CV-00113-JRG, Claim Construction Memorandum and Order, Ericsson Exhibit 1041, Mar. 16, 2022.

*Petitioner: Ericsson Inc.,* v. *Patent Owner: Koninklijke KPN N.V.*, United States Patent and Trademark Office Before the Patent Trial and Appeal Board, IPR2022-00401, U.S. Pat. No. 9,549,426 B2, Decision Denying Institution of Inter Partes Review 35 U.S.C. §314, 25 pages, dated: Jul. 8, 2022.

Plaintiff: *Koninklijke KPN N.V.,* v. Defendants: *Telefonaktiebolaget LM Ericsson, Ericsson Inc.*; In The United States District Court Eastern District of Texas Marshall Division, Case No. 2:21-cv-113, Defendants' Responsive Claim Construction Brief, KPN Ex. 2004-IPR2022-00068, 35 pages; dated: Jan. 26, 2022.

U.S. Patent and Trademark Electronic Filing for IPR2022-00068—Disclaimer in Patent Under 37 C.F.R. 1.321(a) for U.S. Pat. No. 9,549,426, dated: Feb. 22, 2022.

Location Update Services—Ericsson Exhibit 1043—*Ericsson* v. *Koninklijke KPN N.V.* IPR2022-00068, 3 pages, Apr. 22, 1999.

European Telecommunication Standard, ETS 300 974, Digital cellular telecommunications system (Phase 2+); Mobile Application Part (MAP) specification (GSM 09.02 version 5.5.2) Second Edition, 760 pages, Oct. 1997.

*Petitioner: Ericsson Inc.* v. *Patent Owner: Koninklijke KPN N.V.*, United States Patent and Trademark Office, Before the Patent Trial and Appeal Board, (IPR2022-00068) Judgment: Final Written Decision, Cancelling All Remaining Originally Challenged Claims Denying Patent Owner's Motion to Amend 35 U.S.C. §318(a), 32 pages, May 16, 2023.

(56) References Cited

OTHER PUBLICATIONS

Eberspächer, Jörg, et al., "GSM Architecture, Protocols and Services, 3rd Edition," Wiley, Jan. 15, 2020.
GSM Technical Specification—Digital Cellular Telecommunications System (Phase 2+); Mobile Radio Interface Layer 3 Specification (GSM 04.08), Version 5.3.0, 515 pages (Jul. 1996).
*Koninklijke KPN N.V.,* v. *Telefonaktiebolaget LM Ericsson, Ericsson Inc.*—United States District Court Eastern District of Texas Marshall Division, Case No. 2:21-cv-113, Parties' Joint Claim Construction and Prehearing Statement Pursuant to Patent Rule 4-3, KPN Ex. 2002-IPR2022-00068, 35 pages, Dec. 6, 2021.
*Koninklijke KPN N.V.,* v. *Telefonaktiebolaget LM Ericsson, Ericsson Inc.*, United States District Court Eastern District of Texas Marshall Division, Case No. 2:21-cv-113, Patent Rule 4-5(d) Joint Claim Construction Chart, KPN Ex. 2006-IPR2022-00068, 56 pages, dated Feb. 9, 2022.
*Koninklijke KPN N.V.,* v. *Telefonaktiebolaget LM Ericsson, Ericsson Inc.*, United States District Court Eastern District of Texas Marshall Division, Case No. 2:21-cv-113, Plaintiff's Disclosure of Asserted Claims and Infringement Contentions Pursuant to Local Patent Rules 3-1 and 3-2, Ericsson Exhibit 1018, 162 pages, dated: Sep. 15, 2021.
*Koninklijke KPN N.V.,* v. *Telefonaktiebolaget LM Ericsson, Ericsson Inc.*, Plaintiff Koninklijke KPN N.V.'s, United States District Court Eastern District of Texas Marshall Division, Case No. 2:21-cv-113, Opening Claim Construction Brief, KPN Ex. 2003-IPR2022-00068, 55 pages, dated: Jan. 5, 2022.
*Koninklijke KPN N.V.,* v. *Telefonaktiebolaget LM Ericsson, Ericsson Inc.*, Plaintiff Koninklijke KPN N.V.'s, United States District Court Eastern District of Texas Marshall Division, Case No. 2:21-cv-113, Reply Claim Construction Brief, KPN Ex. 2005-IPR2022-00068, 15 pages, dated: Feb. 4, 2022.
European Search Report, European Application No. 20184123, dated Oct. 7, 2020.
Plaintiff: *Koninklijke KPN N.V.,* v. Defendants: *Telefonaktiebolaget LM Ericsson, Ericsson Inc.*; United States District Court Eastern District of Texas Marshall Division, Case No. 2:21-cv-113, Defendants' Invalidity Contentions; KPN Ex. 2004-IPR2022-00068; 129 pages; dated: Appendix D1-D6, and I, Nov. 16, 2021.
*Koninklijke KPN N.V.,* v. *Telefonaktiebolaget LM Ericsson, Ericsson Inc.*, United States District Court Eastern District of Texas Marshall Division, Case No. 2:21-cv-113, Expert Report of Prof. Stephen B. Wicker, Ph.D. Regarding Invalidity of U.S. Pat. Nos. Re. 48,089, 9,253,637 and 9,549,426, 482 pages, dated: Apr. 11, 2022.
Gratorp, A., et al., "The Telecommunications Technology Journal," Ericsson Review, No. 1, pp. 1-238 (1999).
3GPP TS 23.002 v11.1.0 (Dec. 2011), 3rd Generation Partnership Project; Technical Specification Group Services and System Aspects; Network architecture; (Release 11), published Dec. 2011.
3GPP TS 23.008 v11.2.0 (Dec. 2011), 3rd Generation Partnership Project; Technical Specification Group Core Network and Terminals; Organization of subscriber data; (Release 11), published Dec. 2011.
3GPP TS 23.228 v11.3.0 (Dec. 2011), 3rd Generation Partnership Project; Technical Specification Group Services and System Aspects; IP Multimedia Subsystem (IMS); Stage 2 (Release 11), published Dec. 2011.
3GPP TS 23.401 v11.0.0 (Dec. 2011), 3rd Generation Partnership Project; Technical Specification Group Services and System Aspects; General Packet Service (GPRS) enhancements for Evolved Universal Terrestrial Radio Access Network (E-UTRAN) access; (Release 11), published Dec. 2011.
3GPP TS 23.060 v11.0.0 (Dec. 2011), 3rd Generation Partnership Project; Technical Specification Group Services and System Aspects; General Packet Service (GPRS) Service Description, Stage 2; (Release 11), published Dec. 2011.
*Ericsson Inc., Petitioner,* v. *Koninklijke KPN N.V., Patent Owner*, United States Patent and Trademark Office, Before the Patent Trial and Appeal Board, IPR2022-00068, U.S. Pat. No. 9,549,426 B2, Decision Granting Institution of Inter Partes Review 35 U.S.C. §314, 26 pages, May 25, 2022.
3rd Generation Partnership Project; Technical Specification Group Core Network and Terminals; Organization of subscriber data (Release 12), 3GPP TS 23.008, V12.0.0, Jun. 2013, 111 pages.
3rd Generation Partnership Project; Technical Specification Group Services and System Aspects; Architecture enhancements for non-3GPP accesses (Release 12), 3GPP TS 23.402 , V12.0.0, Mar. 2013, 253 pages.
3rd Generation Partnership Project; Technical Specification Group Services and System Aspects; Network architecture (Release 12), 3GPP TS 23.002, V12.1.0, Dec. 2012, 105 pages.
3rd Generation Partnership Project; Technical Specification Group Services and System Aspects; Service requirements for Machine-Type Communications (MTC); Stage 1 (Release 12), 3GPP TS 22.368, V12.2.0, Mar. 2013, 24 pages.
3rd Generation Partnership Project; Technical Specification Group Services and System Aspects; System improvements for Machine-Type Communications (MTC) (Release 11), 3GPP TR 23.888, V11.0.0, Sep. 2012, 165 pages.
PCT International Search Report and Written Opinion, PCT International Application No. PCT/EP2014/065071, dated Oct. 14, 2014.
European Search Report, European Patent Application No. 13176452.4, dated Dec. 17, 2013.

* cited by examiner

METHOD AND TELECOMMUNICATIONS NODE FOR CONTROLLING AN ATTACH STATE OF A USER EQUIPMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

The present application is a national stage entry of, and claims priority to, PCT/EP2014/065071, filed on Jul. 15, 2014, which claims priority to European Patent Application EP 13176452.4, filed in the European Patent Office on Jul. 15, 2013, both of which are hereby incorporated in their entirety herein by reference.

FIELD OF THE INVENTION

The disclosure relates to a method and a telecommunications node for transferring subscription data in a telecommunications system. More specifically, the disclosure relates to controlling the exchange subscription data in a system comprising a subscriber database and an attach control node to which user equipment may connect.

BACKGROUND

Telecommunications networks that provide wireless access (e.g. GSM, UMTS, WiMax, LTE) have developed tremendously over the past years. In such networks, voice and data services can be provided to user equipment having a high mobility, i.e. the communication devices are not bound to a particular location and are freely movable through the area covered by the network. A gateway node of the telecommunications network enables connection to a further network, for example a network based on IP such as the internet.

The availability of such a telecommunications network connected to the further network has resulted in demands for further services, including services that relate to so-called machine-to-machine (M2M) communications, also referred to as machine-type communications (MTC). The service requirements for MTC are currently being standardized in 3GPP (see e.g. TS 22.368). MTC applications typically involve hundreds, thousands or millions of user equipment (MTC devices) which each act as a user equipment to the telecommunication network. Such MTC devices may be stationary or non-stationary. An example involves the electronic reading of e.g. 'smart' electricity meters at the homes of a large customer base over the telecommunications network from a server connected to a further network. Other examples include sensors, meters, vending or coffee machines, car meters for route pricing applications, navigation equipment etc. that can be equipped with communication modules that allow exchanging information with other equipment, such as a data processing centre over the telecommunications network.

An important dimensioning parameter for control plane nodes in the wireless telecommunications networks is the number of simultaneously attached/registered user equipment.

Since MTC typically involves a very large number of MTC devices that send/receive only a low amount of user plane data, the use of control plane resources needed for these MTC devices is high compared to the user plane data that is normally the basis for pricing. The absorbed capacity and costs associated with large numbers of MTC devices are therefore high compared to the actual use and turnover. Solutions to mitigate the burden of keeping high amounts of MTC devices registered in the network would be beneficial.

The issue of registering large numbers of MTC devices in the telecommunications network has been recognized and discussed in various 3GPP working groups. In a potential solution described in 3GPP TR 23.888, an MTC device would not be registered in the telecommunications network when it does not communicate. The MTC device will attach and connect to the network when triggered from the network. The trigger involves enabling the MTC device to listen to a broadcast channel (e.g. a cell broadcast channel) while not being attached to the network. Triggers to the MTC device to establish communication are broadcasted over the broadcast channel. The MTC device(s) for which the broadcasted message/trigger is intended is (are) configured to recognize the message. In this way, network resources associated with registering a large number of MTC devices in the network are saved.

However, non-registration of the MTC devices in the telecommunications network may be disadvantageous in certain cases. For example, the transmission of a cell broadcast signal may be inefficient if only a limited number of MTC devices are distributed over a large number of cells of the network and broadcast resources are wasted in view of the limited number of MTC devices to be triggered.

SUMMARY

In view of the above, it is desirable to provide an improved method and telecommunications node for transferring subscription data over a network that takes account of the issues identified above.

To that end, a method for controlling an attach state of a user equipment in an attach control node of a telecommunications system further comprising a subscriber database containing subscription data of the user equipment is disclosed. If an authentication step is required, the attach control node receives authentication data. If authentication is performed, the authentication data is normally received from an authentication centre AuC or an AAA server. Such an authentication centre or server may be integrated with the subscriber database.

In a first transfer stage step following the authentication step, if any, a first set of subscription data is received in the attach control node from the subscriber database. The first set of subscription data is stored in the attach control node. However, the first set of subscription data is insufficient for enabling establishing a communication session between the user equipment and the telecommunications system. The first transfer stage step may be triggered by receiving an attach request from the user equipment at the attach control node.

Since the first set of subscription is insufficient for enabling establishing a communication session between the user equipment and the telecommunications network, if establishing a communication session is required, at least one second set of subscription data is received from the subscriber database in the attach control node during a second transfer stage step. The second transfer stage step is performed after the first transfer stage step. The second set of subscription data is stored in the attach control node. The combination of the first set of subscription data and the second set of subscription data is sufficient for enabling establishing a communication session between the user equipment and the telecommunications network.

Moreover, a computer program product implemented on a computer-readable non-transitory storage medium is disclosed, the computer program product being configured for, when run on a computer, executing the method steps disclosed herein.

Still further, a telecommunications node configured for use in a telecommunications system comprising a subscriber database containing subscription data of a user equipment is disclosed. The telecommunications node is configured for receiving authentication data, if an authentication step is required, in the attach control node. The telecommunications node is also configured for, following the authentication step, if any, a first set of subscription data from the subscriber database in a first transfer stage step and storing the first set of subscription data. The first set of subscription data is insufficient for enabling establishing a communication session between the user equipment and the telecommunications system. The attach control node may be configured to initiate the first transfer stage step in response to receiving an attach request from the user equipment at the attach control node.

If establishing a communication session is required between the user equipment and the telecommunications network, the telecommunications node is configured for receiving in a second transfer stage, following the first transfer stage, at least one second set of subscription data from the subscriber database and storing the second set of subscription data in the attach control node. The combination of the first set of subscription data and the second set of subscription data is sufficient for enabling establishing a communication session between the user equipment and the telecommunications network.

Finally, a user equipment is disclosed that is configured for use with the telecommunications node as described in the previous paragraph. The user equipment is configured for receiving and processing at least one of a partial subscription data transfer indication indicative of storing only the first set of subscription data in the telecommunications node and, if the user equipment is an LTE type user equipment, a non-bearer establishment indication indicative of omitting establishment of a default bearer on a radio path between the LTE type user equipment and the telecommunications node prior to initiation of the second stage being insufficient for enabling establishment.

It is noted that the first transfer stage and the second transfer stage for the subscription data may be distinguished by different transaction identifiers.

By only storing in the attach control node the first set of subscription data and omitting storing at least part of the set of subscription data required for establishing a communication session, a partial attach state is obtained for the user equipment in the telecommunications network. The partial attach state is defined by the content of the first set of subscription data. The storage of the first set of subscriber data in the attach node provides information about the cells where the user devices are positioned, viz. those cells for which the particular attach node is responsible. However, since the first set of subscriber data is not the complete set of subscriber data required for enabling the full attach of the user equipment to the telecommunications system, resources are saved in the attach control node. This disclosed solution provides for a good balance between a better awareness in the network of the cell location of the user equipment and the saving of resources in the attach node.

By defining the content of the first set of subscriber data, (other) benefits associated with having the defined content of the first set of subscriber data available in the attach control node are obtained. For example, the content of the first set of subscriber data may comprise a parameter known as the network access mode. The NAM is e.g. defined in 3GPP TS 23.008. The NAM defines if the subscriber is registered to get access to the CS (non-GPRS/EPS network), to the PS (GPRS/EPS) network or to both networks. The NAM is permanent subscriber data stored in the HSS/HLR. By storing the NAM in the attach control node in response to the attach request, the attach control node is informed to which network the MTC device gets access to.

Examples of subscription data fields of the second set include at least one of the fields APN-OI Replacement, ODB for PS parameters, VPLMN LIPA Allowed Subscribed UE-AMBR and the APN configurations listed in 3GPP TS 23.060, V. 11.3.0 in table 5 of Clause 13.1. 3GPP TS 23.060 is for 2G/3G Packet Switched, the equivalent for LTE (HSS) is 3GPP TS 23.401, V.12.0.0 table 5.7.1-1.

Another advantageous effect of the disclosed method and telecommunications node is that the network operator is in control whether or not to allow a communication session with the user equipment. Only when the at least one second set of subscriber data is available at the attach control node, a request by the user equipment for a communication session can be allowed. By informing the user equipment of the partial attach state, the user equipment may even be instructed not to send such a request during the partial attach state.

It should be appreciated that the first and the at least one second set of subscription data may be predefined in advance or be selected upon transferring the subscription data to the attach control node or storing the subscription data in the attach control node, e.g. depending on a condition.

The term subscriber data is used to designate all information associated with a subscription which is required for service provisions, identification, routing, communication session handling, GPRS mode transmission, charging, subscriber tracing, operation and maintenance purposes. Some subscriber data are referred to as permanent subscriber data, i.e. they can only be changed by administration means. Other data are temporary subscriber data which may change as a result of normal operation of the system. It is not necessary or required that all subscriber data are transferred to the attach control node.

It should be appreciated that the communication session may be either a data session or a session involving establishment of a voice channel.

It should also be appreciated that some subscription data, such as the IMSI of the user equipment, that play a role in the attach control state, is also used during authentication. As disclosed, if an authentication step is performed, subscription data present for authentication purposes in the attach control node are not considered to be part of the first set of subscription data.

It should be appreciated that during the first transfer stage, all subscriber data may be transmitted in that step from the subscription database to the attach control node. The attach control node only stores the first set of subscriber data from the received subscriber data.

It should be appreciated that the second transfer stage not necessarily follows the first transfer stage, i.e. the second set of subscriber data is not stored in the attach control node.

The user equipment may e.g. transmit a restricted set of data by other means, e.g. by using a short message service or transmit a restricted set of data via the control plane.

The establishment of a communication session between the user equipment and the telecommunications session may comprise establishing a user data plane communication session, e.g. a PDP context or an EPS bearer.

Finally, it should be appreciated that the term user equipment in the present disclosure may include devices with or without SIM/UICC.

In an embodiment of the method and telecommunications node, alternatives for storing the first set of subscription data in the attach control node are disclosed.

In one alternative, a request is transmitted from the attach control node to the subscriber database, optionally in response to receiving an attach request from the user equipment at the attach control node, and receiving only the first set of subscription data on the basis of a partial transfer indication associated with the user equipment in the subscription database. In this embodiment, the control of transmitting only first set of subscription data lies with the system containing the subscription database, dependent on the setting of the partial transfer indication.

In another alternative, a request is transmitted from the attach control node to the subscriber database, the request containing a partial transfer indication. The partial transfer indication may originate from the attach control node, i.e. control of only transmitting the first set of subscriber data lies with the attach control node. For example, if the attach control node determines that it only has limited resources available, it may decide to transmit the partial transfer indication to the subscriber database system. In a variant, the attach control node receives an attach request from the user equipment, wherein the attach request from the user equipment already contains a partial transfer indication. The attach control node may either forward the partial transfer indication originating from the user equipment or provide for an alternative partial transfer indication in response to the partial transfer indication received from the user equipment. In this variant, the user equipment controls the transmission of only the first set of the subscriber data as may e.g. be advantageous for a user equipment not requiring a communication session any time soon. The attach control node may be configured to overrule the transfer indication of the user equipment. In one variant, a partial transfer indication may be received from the user equipment, but the attach control node may decide that a full attach with all subscription data is desired or required. In another variant, the attach control node may receive a conventional attach request from the user equipment but decide to only allow a partial attach (for example because of limited available resources) and thus transmit a request with a partial transfer indication to the subscriber database.

Yet another alternative comprises receiving a complete set of subscriber data from the subscriber database and storing only a first set of subscriber data from the received subscriber data in response to a partial attach state indication in the attach control node. In this alternative, the decision to store only the first set of subscriber data lies with the attach control node as well.

In another embodiment, the transfer of the at least one second set of subscription data is stored in the attach control node as a result of fulfillment of a precondition.

In one alternative, the second set of subscription data is stored in response to a data availability indication in the telecommunications system indicating the availability of data for the user equipment. In this alternative, the at least one second set of subscription data is transmitted when data is to be sent to the user equipment, so that the communication session relevant subscription data need to be with the attach control node.

In another alternative, the second set of subscription data may be desired with the attach control node in response to a resource availability indication received from the attach control node at the subscription database indicating the availability of resources for containing the second set of subscription data in the attach control node. In this case, a communication session may be established more quickly.

In yet another alternative, the second set of subscription data may be stored with the attach control node at a predefined time or within a predefined time interval. This case is advantageous if information is available within the telecommunications system when a user equipment desires to establish a connection with the telecommunications system. Such information may e.g. be available from a contract between the operator of the telecommunications system and the operator of the user equipment. As an example, such a contract may determine the time at which or the time interval during which the user equipment will or is allowed to transmit data.

In an embodiment of the method and telecommunications node, the at least one second set of subscription data from the combination of the first and second set of subscription data is deleted after a precondition has been fulfilled. The first set of subscription data may remain in the attach control node. The precondition may relate to the expiry of a timer, the detection of the end of the communication session for the user equipment and/or to the detection of limited availability of (free) resources in the attach control node.

Resources may also be saved on the radio path between the user equipment and the telecommunications system, particularly for LTE telecommunications system. Prior to the initiation of the second transfer stage, establishment of a default bearer is omitted. The default bearer may be established after initiation of the second transfer stage since the transfer of the second set of subscription data may be initiated in order to transfer data to or from the user equipment, requiring the presence of the default bearer. The user equipment may be informed of the non-establishment of the default bearer (either explicit or implicit) and should be configured not to process the lack of a default bearer as an unsuccessful attach.

It is noted that the invention relates to all possible combinations of features recited in the claims. Thus, all features and advantages of the first aspect likewise apply to the second and third aspects, respectively.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
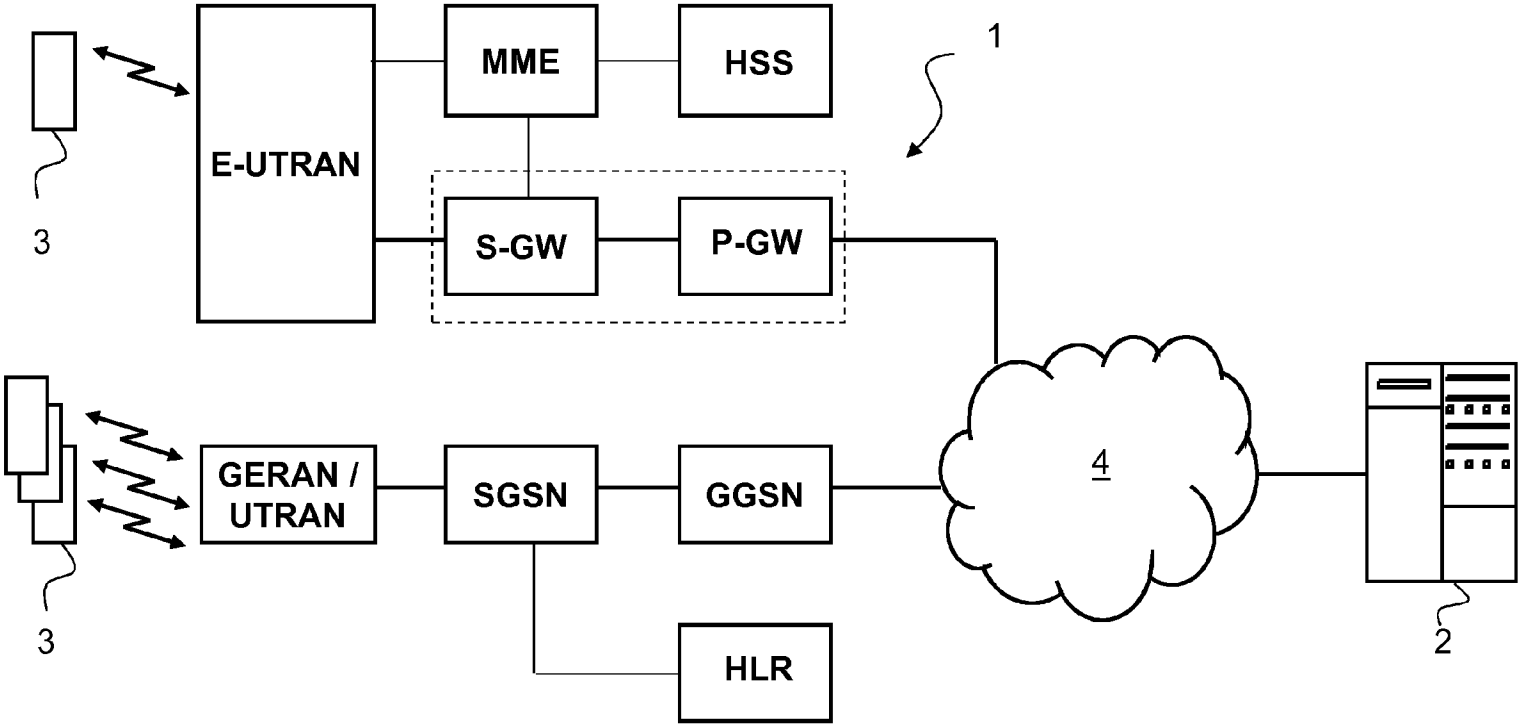
FIG. 1 is a schematic illustration of a telecommunications system.

FIG. 1 shows a schematic illustration of a telecommunications system 1. The telecommunications system 1 enables communication sessions between an application server 2 and a user equipment 3 over a data network 4, wherein access of the user equipment 3 to the telecommunications system 1 is wireless.

In the telecommunications system of FIG. 1, three generations of telecommunications networks are schematically depicted together for purposes of brevity. A more detailed description of the architecture and overview can be found in 3GPP TS 23.002 and 3GPP TS 23.060, 3GPP TS 23.401 and 3GPP TS 23.402, which are included in the present application by reference in its entirety.

The lower branch of FIG. 1 represents a GPRS or UMTS telecommunications system comprising a Gateway GPRS Support Node (GGSN), a Serving GPRS Support Node (SGSN) and a Radio Access Network (GERAN or UTRAN). For a GSM/EDGE radio access network (GERAN), the wireless access network comprises a Base Station Controller (BSC) connected to a plurality of Base Station Transceivers (BTSs), both not shown. For a UMTS radio access network (UTRAN), the wireless access network comprises a Radio Network Controller (RNC) connected to a plurality of NodeBs, also not shown. The SGSN is conventionally connected to a Home Location Register (HLR) that contains subscription data of the user equipment 3.

The upper branch in FIG. 1 represents a next generation telecommunications system, commonly indicated as Long Term Evolution (LTE) or Evolved Packet System (EPS). Such a system comprises a PDN Gateway (P-GW) and a Serving Gateway (S-GW). The E-UTRAN of the EPS comprises evolved NodeBs (eNodeBs or eNBs) providing wireless access for a user equipment 3 that is connect-connected to the S-GW via a packet network. The S-GW is connected to a Mobility Management Entity MME for signalling purposes which is in turn connected to a Home Subscriber Server HSS. The HSS includes a subscription profile repository containing subscription data for the user equipment 3.

The user equipment 3 comprises an MTC device and the application server 2 may be an MTC server serving a large number of MTC devices 3.

Figure 2A:
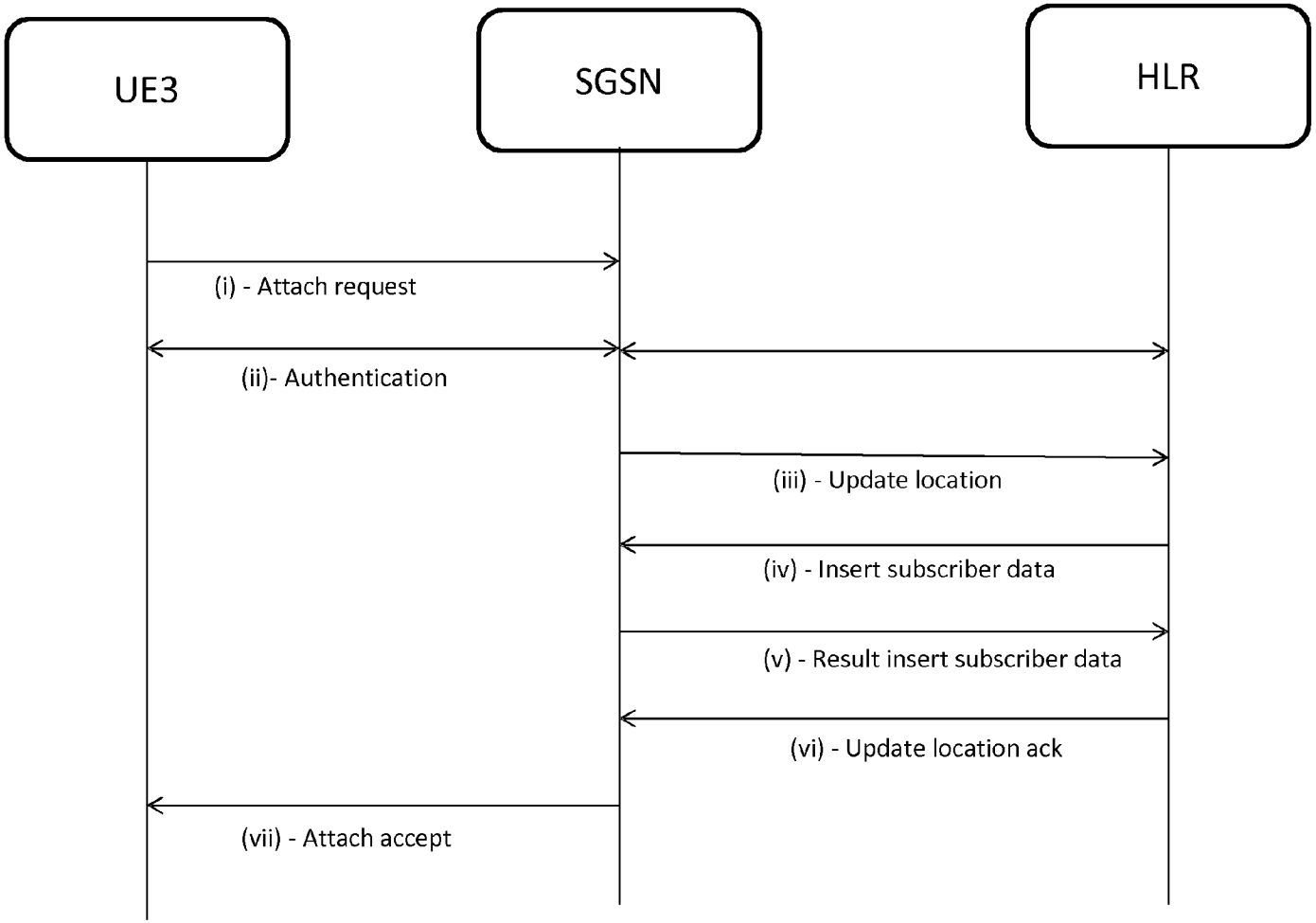
FIGS. 2A-2C are prior art sequence diagrams illustrating steps in establishing a communication session for a user equipment in the telecommunications system of FIG. 1.

FIG. 2A is a prior art sequence diagram illustrating initial steps in establishing a communication session for a user equipment 3 in the lower branch of the telecommunications system 1 of FIG. 1 (the attach phase). In particular, FIG. 2A illustrates known steps of a packet-switched attach procedure in a 2G/3G network.

In a first step (i), the UE 3 transmits an Attach request to the telecommunications system 1, which Attach request is processed by the SGSN. In a subsequent step (ii), authentication of the UE 3 is performed involving the HLR.

Then, in step (iii), the SGSN transmits an Update location message to the HLR which causes the HLR in step (iv) to transmit the full batch subscriber data associated with the UE 3 user equipment 3 having sent the Attach request in step (i). The specification of the "Insert Subscriber Data" message is e.g. defined in TS 29.002 clause 8.8.1 en TS 29.272 clause 5.2.2.1.

After step (iv), the SGSN stores all the information necessary for completing the attach procedure such that a communication session can be established subsequently by establishing a PDP context for the UE 3.

In steps (v) and (vi), the receipt of the subscriber data is acknowledged.

It should be noted that, as a result of the data size of the subscriber data (the data unit size of the underlying layer may be insufficient to carry all the subscriber data in one data unit), steps (iv) and (v) may be repeated a number of times, to transfer all the data to the SGSN. However, this transfer is performed under the same transaction identifier, i.e. there is only one transfer stage.

Finally, in step (vii), the UE 3 is informed that the Attach request from step (i) has been accepted via an Attach accept message.

Figure 2B:
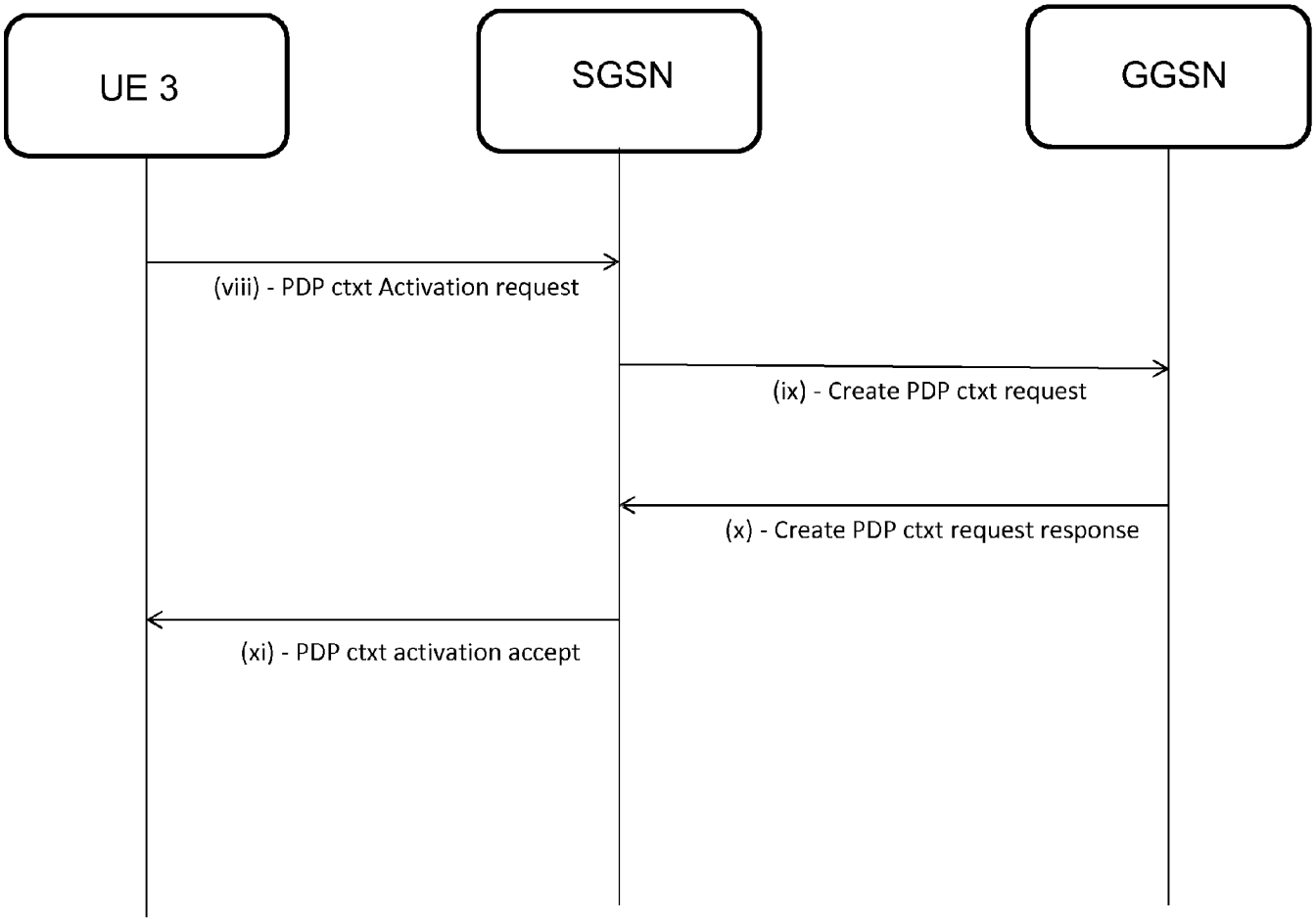

After having received the Attach accept message, the UE 3 is able to request activation of a PDP context procedure in a manner known in the art and as illustrated in steps (viii)-(xi) in FIG. 2B.

Figure 2C:
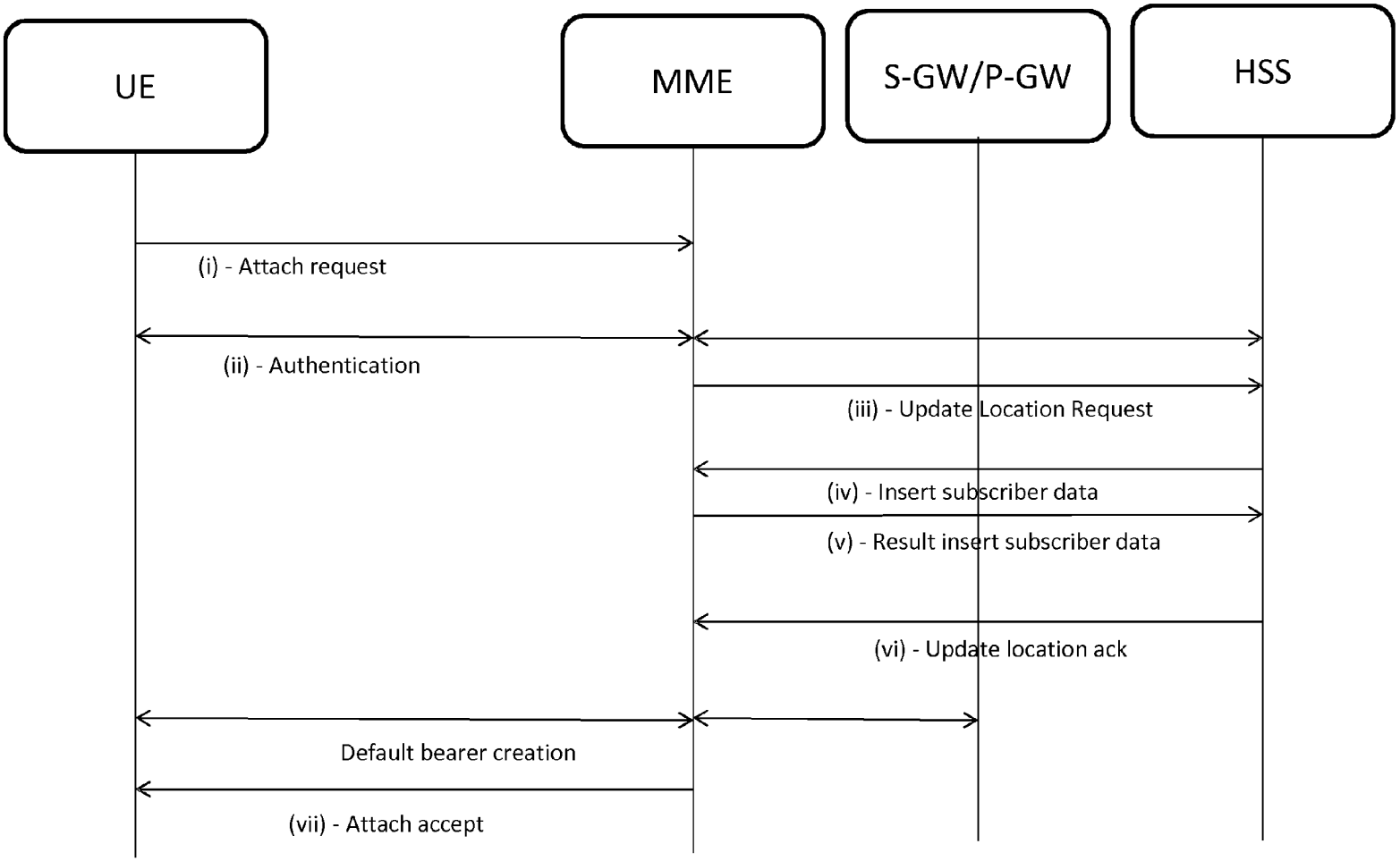

FIG. 2C is a prior art sequence diagram illustrating initial steps in establishing a communication session for a user equipment 3 in the upper branch of the telecommunications system 1 of FIG. 1. In particular, FIG. 2C illustrates known steps of a packet-switched attach procedure in a 4G LTE/EPS network.

In this telecommunications system 1, similar steps are performed for the UE 3 to get attached to the telecommunications system 1 now using the MME and HSS. However, in order to provide for an always on type of service experience, a default bearer is established during the attach procedure as shown in FIG. 2C between the UE and the S-GW and P-GW.

Figure 3:
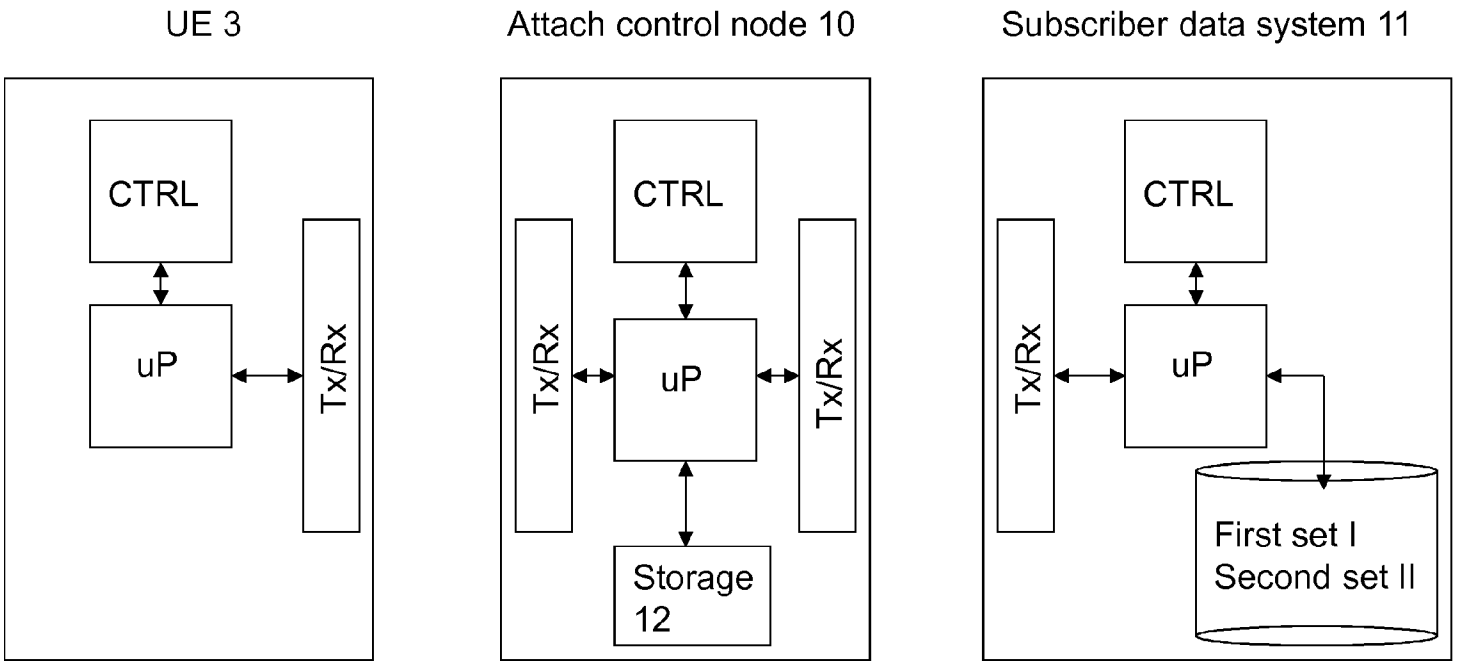
FIG. 3 is a schematic system block diagram illustrating a user equipment, an attach control node and a subscriber data system according to an embodiment of the invention.

FIG. 3 is a schematic system block diagram illustrating a user equipment UE 3, an attach control node 10 and a subscriber data system 11 (a subscriber database) according to an embodiment of the invention. In the block diagrams, some components for performing the disclosed method are schematically illustrated. It should be noted that these components may be implemented in hardware, software or in a hybrid fashion.

The UE 3, the attach control node 10 and the subscriber data system 11 each contain at least a processor uP for executing actions, a controller CTRL for controlling actions by the processor uP and one or more forms of storage (not shown) for storing computer programs and (intermediate) processing results. The attach control node 10 contains a storage 12 for storing content, such as subscription data, received from the subscriber data system 11. Obviously, each of the UE 3, the attach control node 10 and the subscriber data system 11 comprises one or more communication interfaces (Tx/Rx) as known in the art for communicating with other devices in the telecommunications system or with the UE 3.

The UE 3 may be an MTC device. An example of such an MTC device involves a 'smart' electricity meter at the home of a customer of a large customer base. The smart electricity meter may e.g. have data to report to the application server 2 or may need a software update. Other examples of MTC devices include sensors, meters, vending or coffee machines, car meters for route pricing applications, navigation equipment etc. that can be equipped with communication modules that allow exchanging information with other equipment, such as the application server 2.

The attach control node 10 is configured for controlling attachment of the UE 3 to the telecommunications system 1. Examples of such attach control nodes 10 comprise an SGSN (as briefly described with reference to FIG. 2A), an MME (as briefly described with reference to FIG. 2C) and an MSC server (not depicted, comparable to FIG. 2A since the MSC server is comparable to SGSN in this case).

The subscriber data system 11 stores the subscription data for all UE's 3 that have a contract with the network provider. Examples of such subscriber data systems include an HLR (as briefly described with reference to FIGS. 1 and 2A) and an HSS (as briefly described with reference to FIGS. 1 and 2C).

Figure 4:
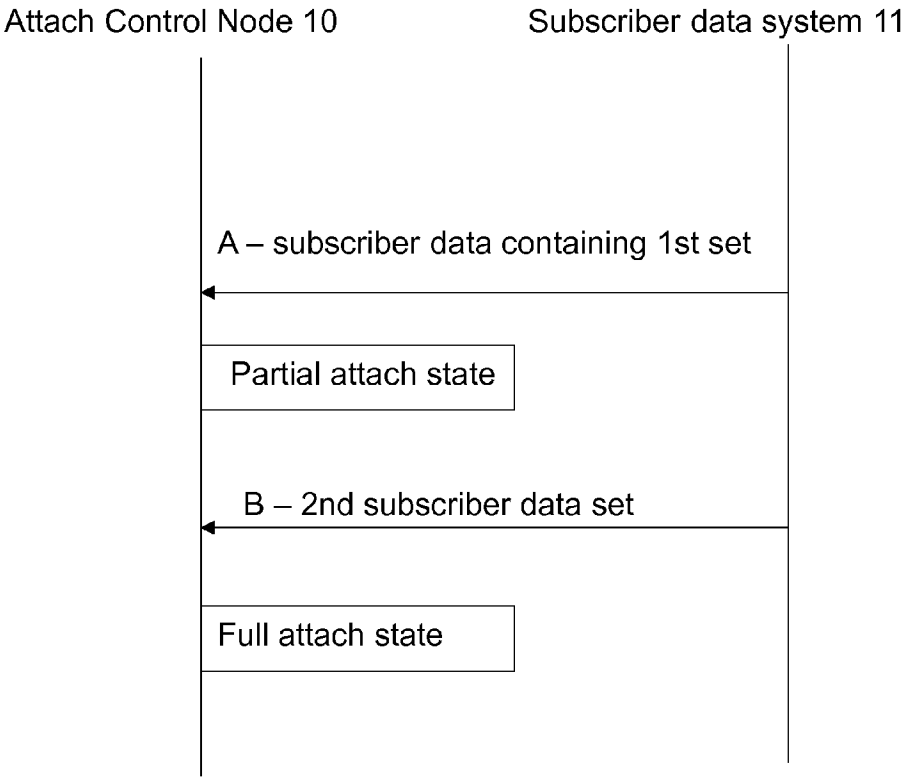
FIG. 4 is a sequence diagram illustrating steps according to the disclosed method.

FIG. 4 is a sequence diagram illustrating the basic steps of the disclosed method. In a first step A, subscription data is transmitted from the subscriber data system 11 to the attach control node 10. The attach control node 10 stores a first set of subscription data insufficient for enabling establishment of a communication session between the user equipment and the telecommunications system. The first step A may be triggered by receiving an attach request from the UE 3 at the attach control node 10 followed by an indication (not shown) from the attach control node 10 to the subscriber database 11.

The storage of the first set of subscriber data results in a partial attach state for the user equipment UE 3 in the telecommunications system. The partial attach state is defined by the content of the first set of subscriber data.

Only in response to another trigger, subscriber data is transferred from the subscriber data system to the attach control node such that a complete attach of the user equipment to the telecommunications system is possible (step B). Then, the attach control node is in the same state as after step (iv) in FIGS. 2A and 2C (without the default bearer) depicting the prior art.

Since the first set of subscriber data is not the complete set of subscriber data required for enabling the full attach of the user equipment to the telecommunications system, resources are saved in the attach control node 10 in the partial attach state. On the other hand, by defining the content of the first set of subscriber data, benefits associated with having the defined content of the first set of subscriber data available in the attach control node are obtained. The content of the first set of subscriber data may enable individually addressing user equipment (e.g. triggering a user equipment with an SMS message).

The content of the first set of subscriber data may comprise a parameter known as the network access mode. The NAM is e.g. defined in 3GPP TS 23.008. The NAM defines if the subscriber is registered to get access to the CS network (non-GPRS/EPS network), to the PS network (GPRS/EPS network) or to both networks. The NAM is permanent subscriber data stored in the HSS/HLR. By registering the NAM in the attach control node in response to the attach request, the attach control node is informed to which network the user equipment gets access to.

Examples of subscription data fields of the second set include at least one of the fields APN-OI Replacement, ODB for PS parameters, VPLMN LIPA Allowed Subscribed UE-AMBR and the APN configurations listed in 3GPP TS 23.060, V. 11.3.0 in table 5 of Clause 13.1. 3GPP TS 23.060 is for 2G/3G Packet Switched, the equivalent for LTE (HSS) is 3GPP TS 23.401, V.12.0.0 table 5.7.1-1.

In the disclosed method, a purpose-related distinction may have been made with respect to the subscription data. A first set I of subscription data may be defined that as such is insufficient for enabling establishment of a communication session between the UE 3 and the telecommunications system 1. A first set only containing the NAM is mentioned above is an example. In other words, the first set I of subscription data would not allow establishment of a PDP context, e.g. the messages (ix)-(xi) of FIG. 2B would not be transmitted if only the first set of subscription data would be available at the SGSN.

A second set II of subscription data is defined that, in combination with the first set I of subscription data would be sufficient for enabling activation of a communication session between the UE 3 and the telecommunications system 1. In other words, if the attach control node 10 would have available the first and second set of subscription data, a PDP context activation would be successful in the same manner as depicted in FIG. 2B.

The second set II of subscription data would e.g. comprise communication session management subscription data, e.g. data related to an access point name APN that is allowed by the subscription (subscribed APN(s)), e.g. APN configurations.

Below, a table is provided with examples of fields that may be part of the second set II of subscription data.

| Field | Description |
|---|---|
| APN-OI Replacement | Indicates the domain name to replace the APN-OI when constructing the GGSN/PDN GW FQDN upon which to perform a DNS resolution. This replacement applies for all the APNs in the subscriber's profile. See TS 23.003 [4] clause 9.1.2 for more information on the format of domain names that are allowed in this field. |
| ODB for PS parameters | Indicates that the status of the operator determined barring for packet oriented services. |

-continued

| Field | Description |
|---|---|
| VPLMN LIPA Allowed | Specifies per PLMN whether the UE is allowed to use LIPA. |
| Subscribed UE-AMBR | The Maximum Aggregated uplink and downlink MBRs to be shared across all Non-GBR PDP contexts according to the subscription of the user. |
| Each subscription profile may also contain one or more APN configurations: | |
| PDP/EPS Bearer Context Identifier | Index of the PDP/EPS Bearer context. |
| PDP Type | PDP type, e.g. PPP or IP (IPv4, IPv6, IPv4v6). |
| PDP Address | PDP address, e.g., an IP address. This field shall be empty if dynamic addressing is allowed. |
| APN-OI Replacement | APN level APN-OI Replacement which has the same role as the UE level APN-OI Replacement but with higher priority than UE level APN-OI Replacement. This is an optional parameter. When available, it shall be used to construct the GGSN/PDN GW FQDN instead of UE level APNOI Replacement. See TS 23.003 [4] clause 9.1.2 for more information on the format of domain names that are allowed in this field. |
| Access Point Name | A label according to DNS naming conventions describing the access point to the packet data network. For S4-SGSN the APN to be used as default APN is indicated. |
| SIPTO permissions | Indicates whether the traffic associated with this APN is allowed or prohibited for SIPTO |
| LIPA permissions | Indicates whether the PDN can be accessed via Local IP Access. Possible values are: LIPA-prohibited, LIPA-only and LIPA-conditional. |
| QoS Profile Subscribed | The quality of service profile subscribed. QoS Profile Subscribed is the default level if a particular QoS profile is not requested.. QoS Profile Subscribed is also the maximum QoS per PDP context to the associated APN. |
| Subscribed Evolved ARP | The Subscribed Evolved ARP for PDP contexts associated with the APN. |
| VPLMN Address Allowed | Specifies per VPLMN whether the MS is allowed to use the APN in the domain of the HPLMN only, or additionally the APN in the domain of the VPLMN. |
| PDP/EPS Bearer context Charging Characteristics | The charging characteristics of this PDP/EPS Bearer context, e.g. normal, prepaid, flat-rate, and/or hot billing. |
| EPS subscribed QoS profile | The EPS bearer level QoS parameter values for that APN's default bearer (QCI and ARP) |
| APN-AMBR | The maximum aggregated uplink and downlink MBR values to be shared across all Non-GBR EPS bearers, which are established for this APN. |
| P-GW/GGSN address | The address currently used for the P-GW/GGSN supporting this APN |

The contents, i.e. the fields, of the first and second sets I, II of subscriber data may be predefined in advance by e.g. the network operator. The contents of the first and second sets I, II may also be determined upon a trigger to transfer subscription data to the attach control node 10, dependent e.g. on a precondition. For example, if the storage 12 of the attach control node 10 is almost full, a very limited first set I of subscription data may be stored in the attach control node 10. On the other hand, if there is an indication that sufficient storage capacity is available at storage 12, an extensive set of subscription data may be stored in the attach control node 10. Other preconditions may also determine the contents of the first and second set I, II of subscription data, such as e.g. based on what was agreed between the network operator and the owner of the UE 3 (such information e.g. being stored in the subscriber data system).

Figure 5A:
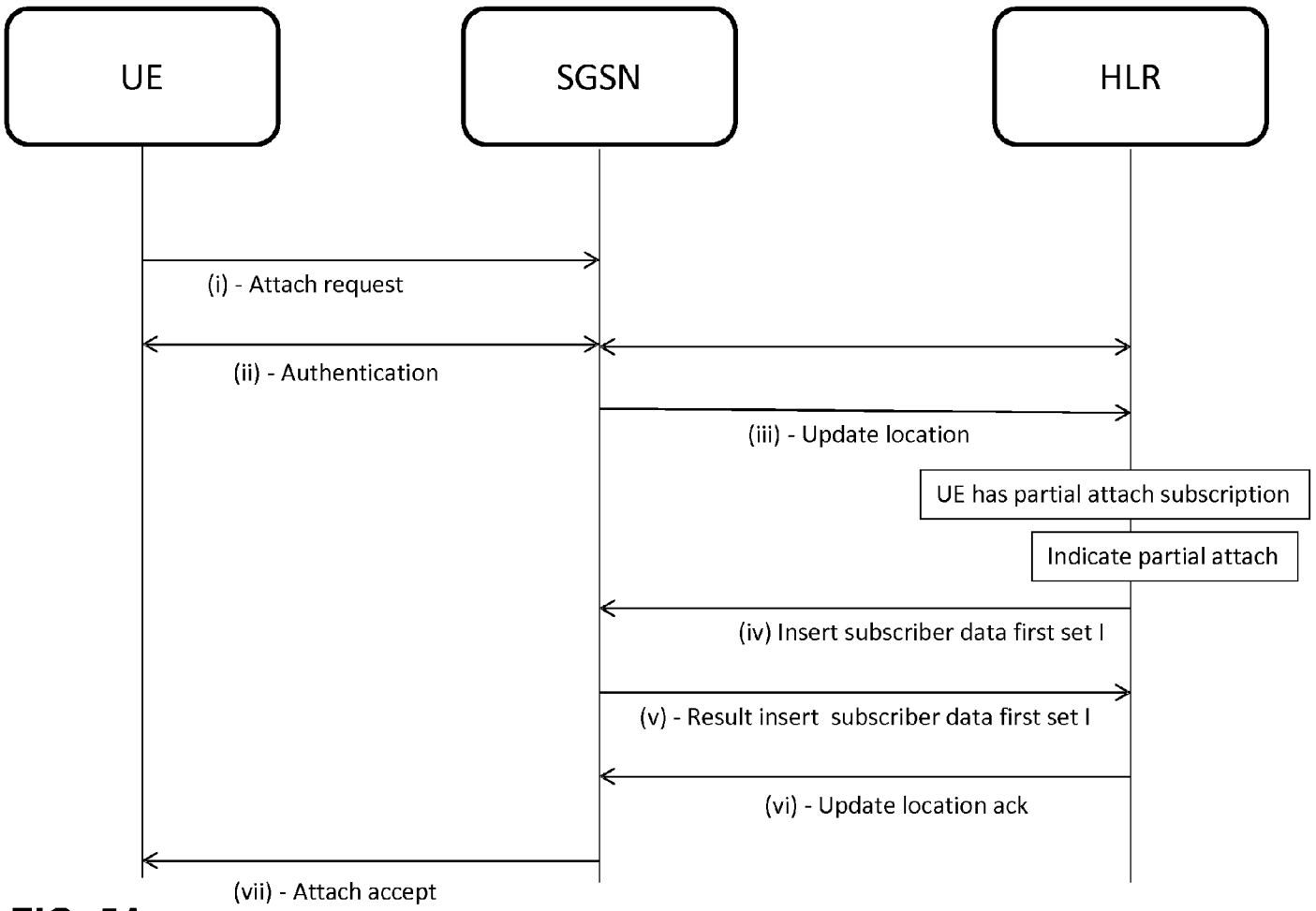
FIGS. 5A-5D are sequence diagrams for a 2G/3G telecommunications system illustrating various embodiments of establishing a partial attach state for a UE.
Figure 5B:
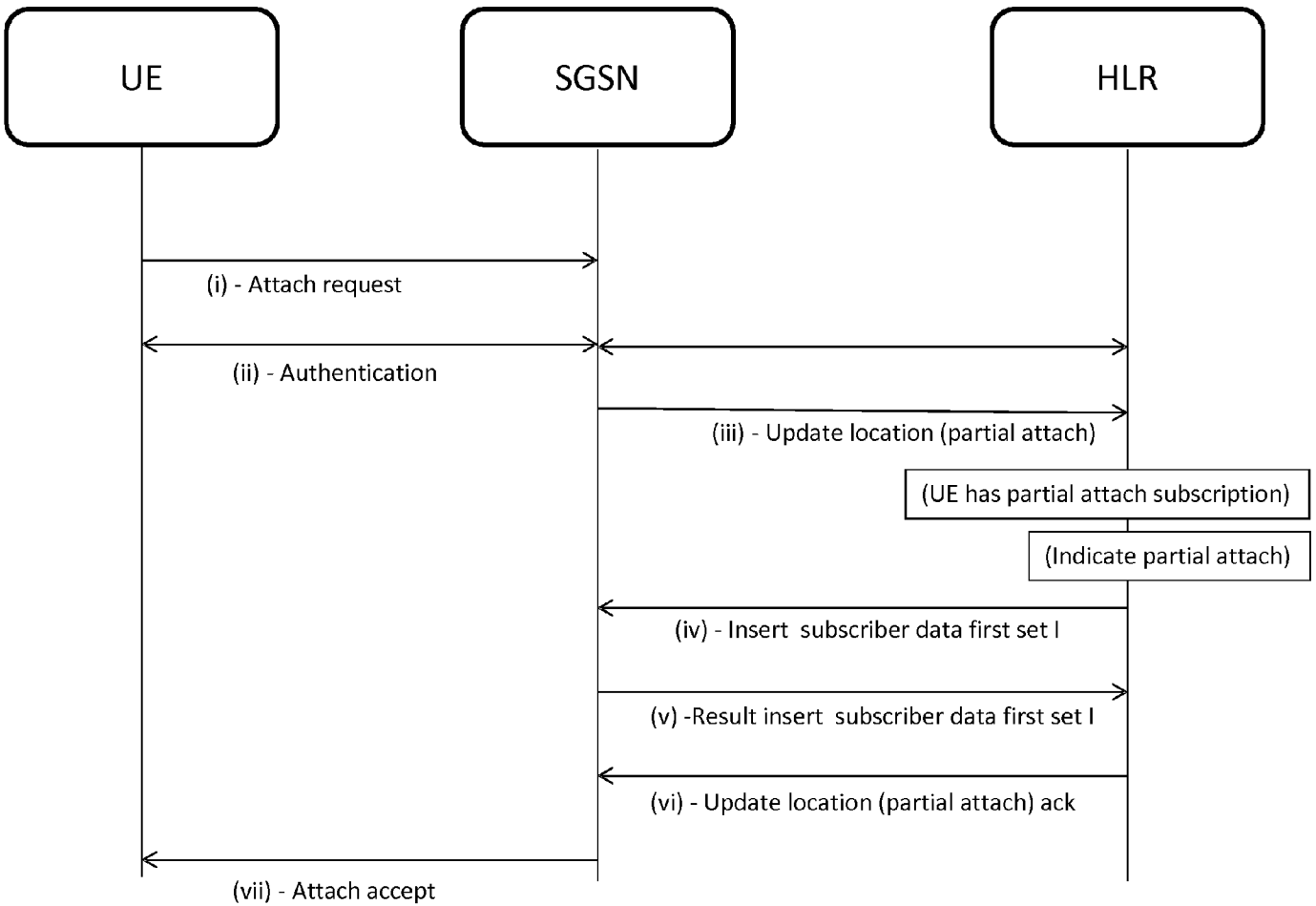
Figure 5C:
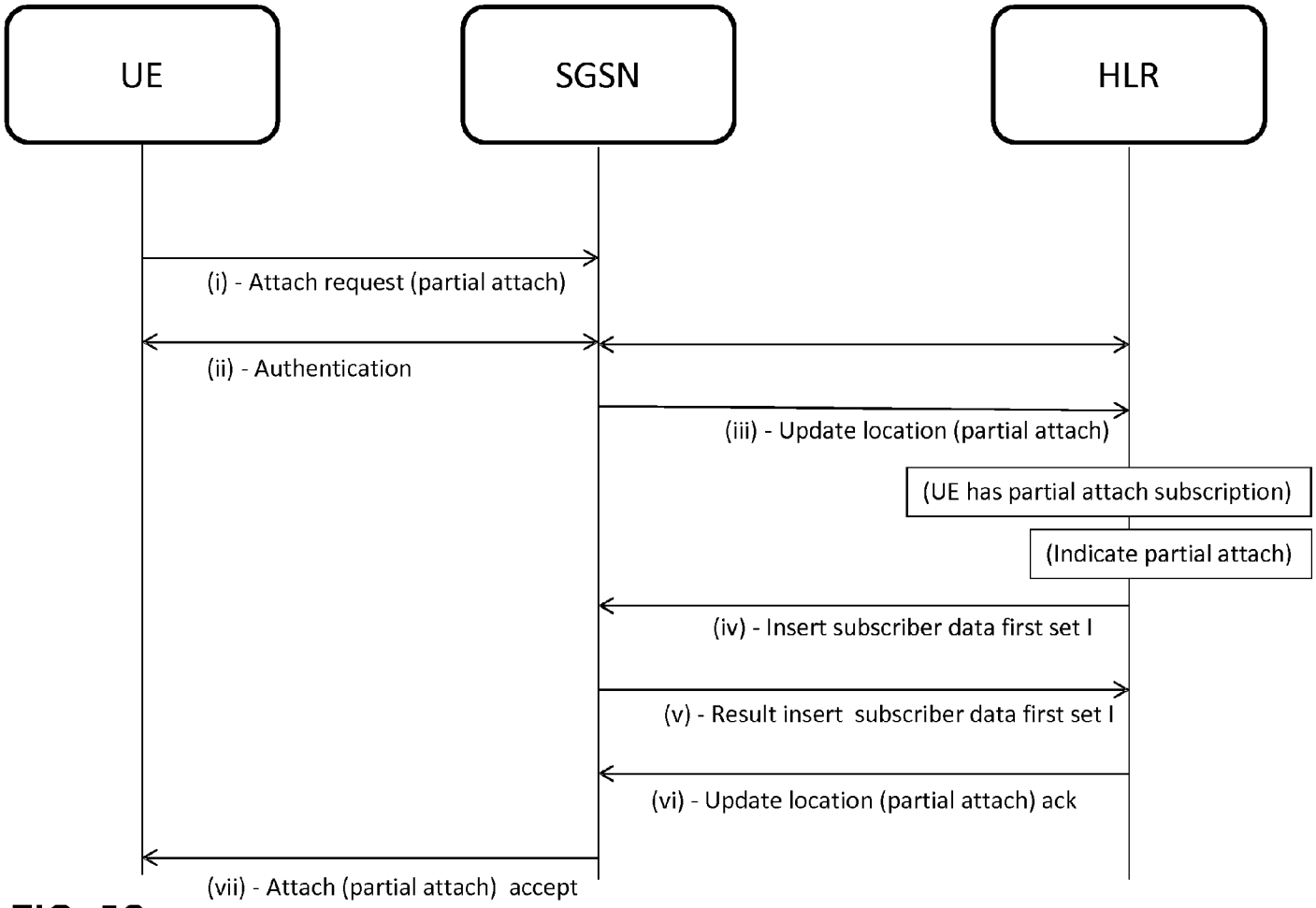

FIGS. 5A-5C are sequence diagrams for a 2G/3G telecommunications system 1 illustrating various embodiments of establishing a partial attach state for a UE in the telecommunications network. Steps similar to the steps shown in FIG. 2A have identical reference numbers. In each of the embodiments, the HLR has or receives a partial transfer indication triggering the HLR to transfer only the first set I of subscription data to the SGSN.

In the sequence diagram of FIG. 5A, steps (i)-(iii) are identical to steps (i)-(iii) of FIG. 2A. However, the HLR contains an indication that the UE 3 has a partial attach subscription. As a consequence of this indication, in step (iv) the controller CTRL of the HLR instructs processor uP to only transmit the first set I of subscription data to the SGSN. The SGSN therefore only receives the first set I of subscription data and stores this first set I in storage 12. The current state of the UE may then be set in the HLR to partially attached. Step (v) now indicates to the HLR that the first set has been received successfully.

In the sequence diagram of FIG. 5B, the SGSN receives an attach request from UE 3 in step (i) and then determines that it can only accommodate a partial attach state for the UE. The determination to request a partial attach can be done on the basis of a precondition, e.g. the current load experienced by the SGSN (i.e. the number of attach requests) or the state (e.g. the free capacity) of the storage 12. Accordingly, in step (iii), the SGSN requests the HLR for a partial attachment of UE 3. Optionally, the HLR has an indication that partial attach is allowed for UE 3. Optionally, the current state of the UE may then be set in the HLR to partially attached. Steps (iv)-(vii) are identical to the corresponding steps in FIG. 5A.

In the sequence diagram of FIG. 5C, it is the UE 3 itself that requests a partial attach. In step (i), the attach request contains an indication that only a partial attach is requested. The SGSN forwards the request from UE 3 for a partial attach to the HLR. Again, optionally, the HLR has an indication that partial attach is allowed for UE 3. Optionally, the current state of the UE may then be set in the HLR to partially attached. Steps (iv)-(vii) are identical to the corresponding steps in FIG. 5A.

Although only shown in FIG. 5C, the Attach accept of step (vii) in FIGS. 5A-5C may contain information indicative for the UE 3 that a PDP context cannot be established. As a consequence, the UE 3 may refrain from transmitting a PDP context Activation request as depicted in FIG. 2B. This may cause a further reduction of the load of the telecommunications system 1.

Figure 6:
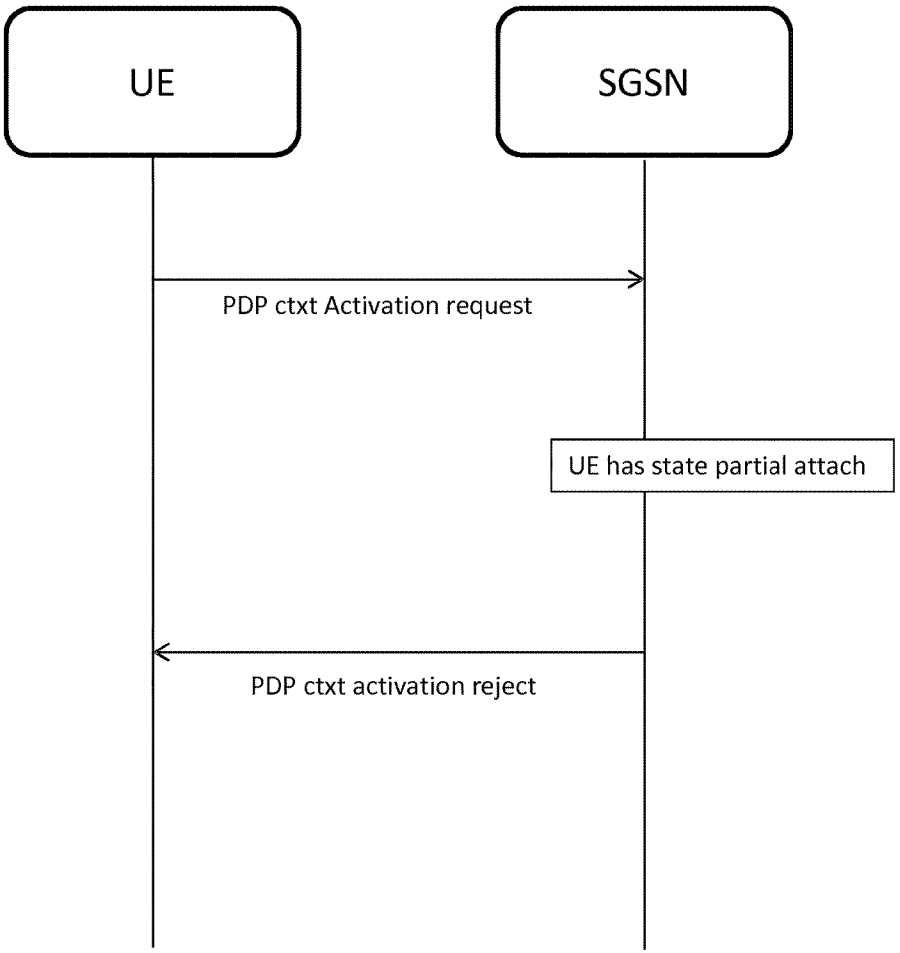
FIG. 6 is a sequence diagram for a 2G/3G telecommunications system illustrating the effect of the partial attach state of the attach control node on a PDP context request from the UE.

In each of the embodiments of FIGS. 5A-5C, the HLR has or receives a partial transfer indication triggering the HLR to transfer only the first set I of subscription data to the SGSN. As mentioned previously, the first set of subscription data is insufficient for enabling establishment of a communication session between the UE 3 and the telecommunications system 1. This effect is illustrated in FIG. 6, wherein the Activation request for a PDP context from the UE 3, if sent, is rejected because the SGSN has only allowed a partial attach for the UE 3. The partial attach state of the SGSN for UE 3 may be implemented by an explicit indication in the SGSN or be implicit by the lack of the second set II of subscription data.

Figure 5D:
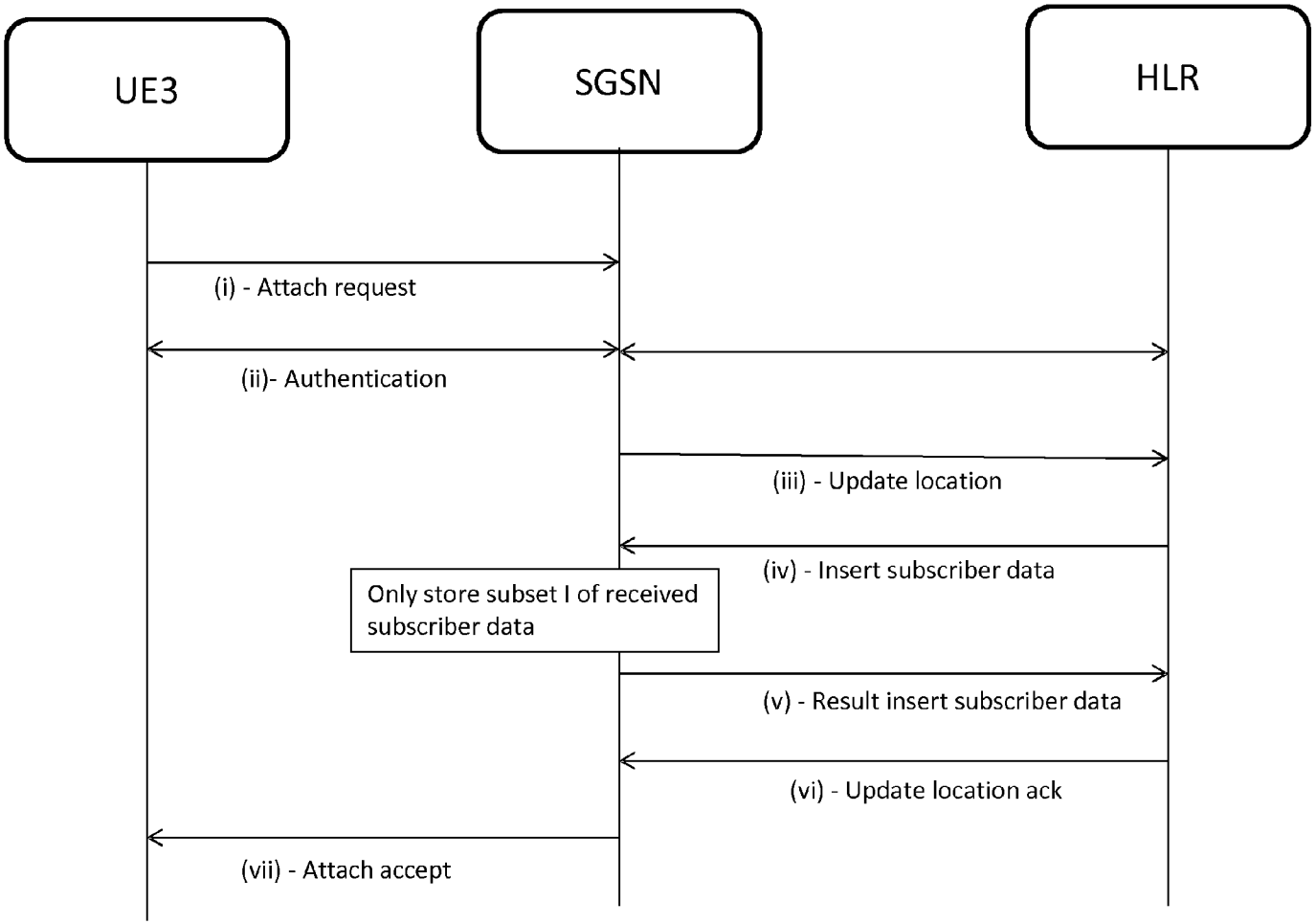

A similar effect may be obtained by transmitting the (complete set of) subscription data to the SGSN but only storing a first set of the subscription data. This is illustrated in FIG. 5D.

Of course, information may be available in the telecommunications system 1 for a UE 3 for which only the first set I of subscription data is available in the attach control node 10. Such information may e.g. originate from application server 2. In order to transfer such information to the UE 3, a PDP context may be established between the UE 3 and the telecommunications system 1. Such a PDP context can be initiated by the UE 3 by sending an SMS message to the UE 3.

Figure 7A:
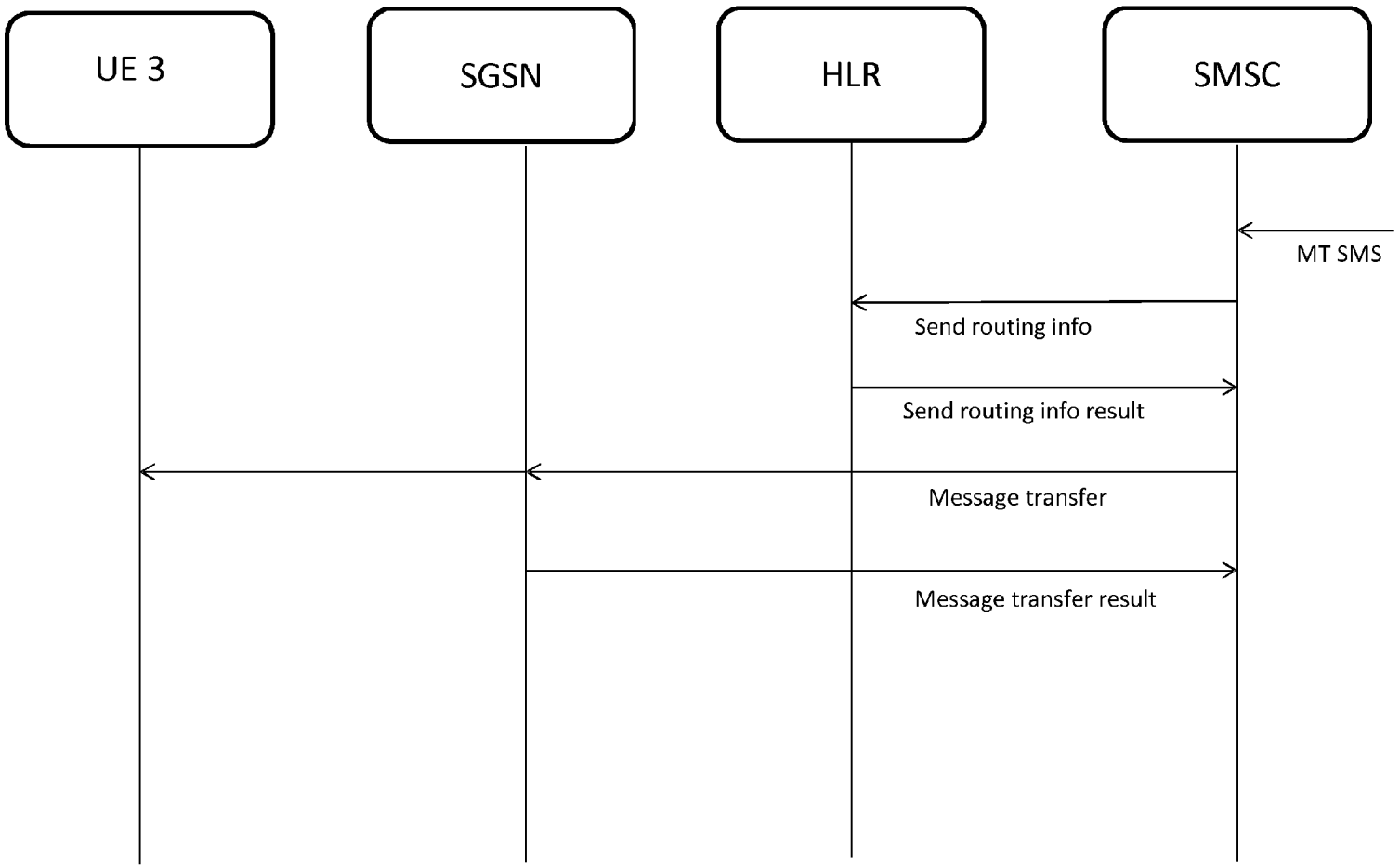
FIGS. 7A-7C are sequence diagrams for a 2G/3G telecommunications system illustrating network-initiated data transmission according to the prior art (FIG. 7A) and according to embodiments of the invention (FIGS. 7B and 7C)

FIG. 7A provides an illustration of steps taken to transfer a message to the UE 3 according to the prior art. It is assumed that the steps of FIG. 2A have already been performed such that all subscription data are stored in the SGSN. An SMS Centre SMSC receives a mobile terminating SMS message MT SMS. In order to determine the SGSN under which UE 3 resides, the SMSC requests routing info from the HLR and receives the relevant SGSN from the HLR in response to the request as shown in FIG. 7A. After receiving the indication of the SGSN, the SMS message is transferred via the SGSN to the UE 3. The SGSN reports to the SMSC that the SMS message has been successfully delivered at the UE 3. The SMS message triggers UE 3 to transmit a PDP Activation request message to the SGSN. Because the SGSN has available all subscriber data, the SGSN can process the PDP context Activation request in a manner as depicted in FIG. 2B.

It is noted that mechanisms other than SMS triggers via the packet switched domain are known for triggering a UE to transmit a PDP context activation request, e.g. by using a cell broadcast, sending a trigger SMS via the circuit switched domain or by using unanswered circuit switched calls.

Figure 7B:
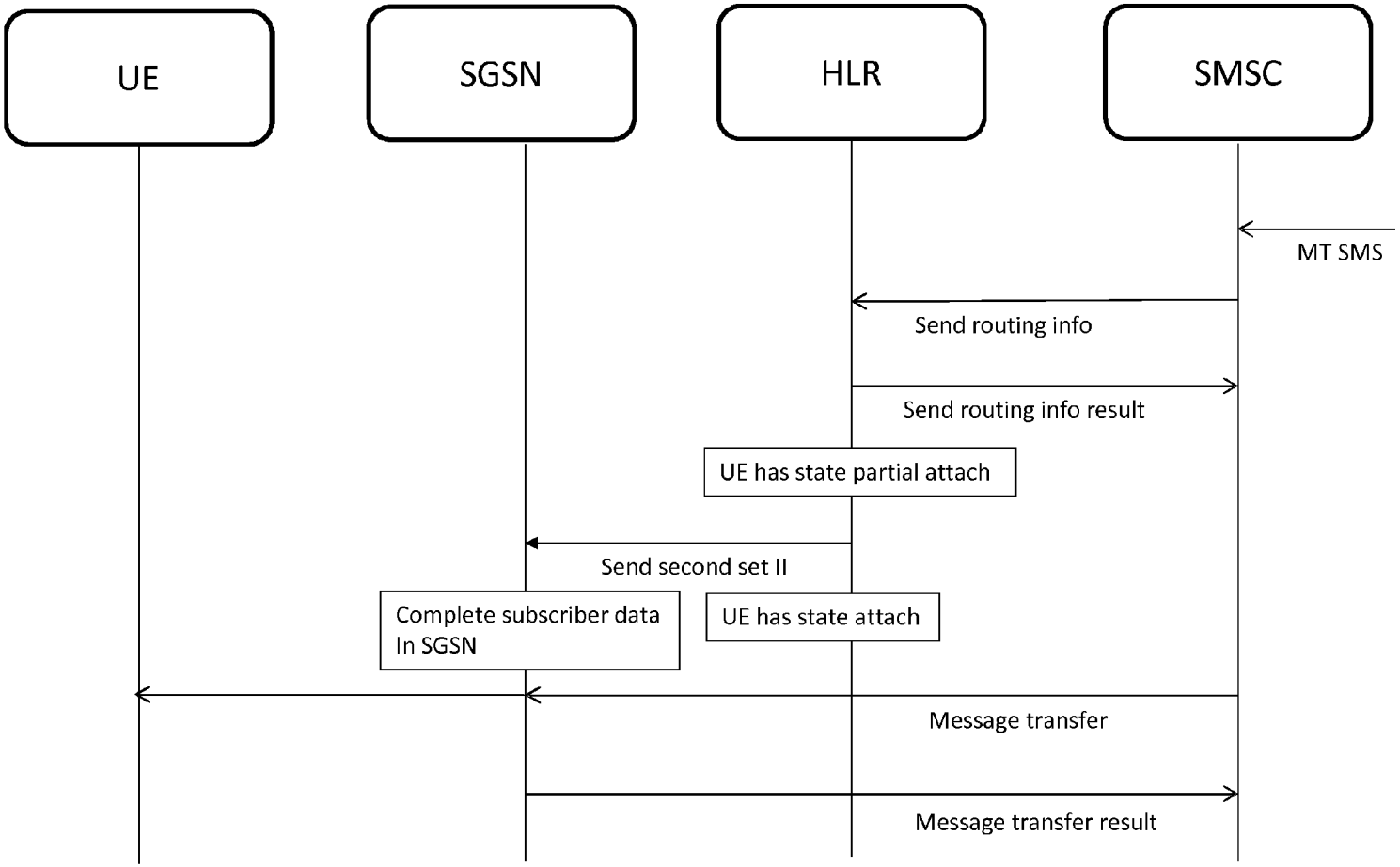
Figure 7C:
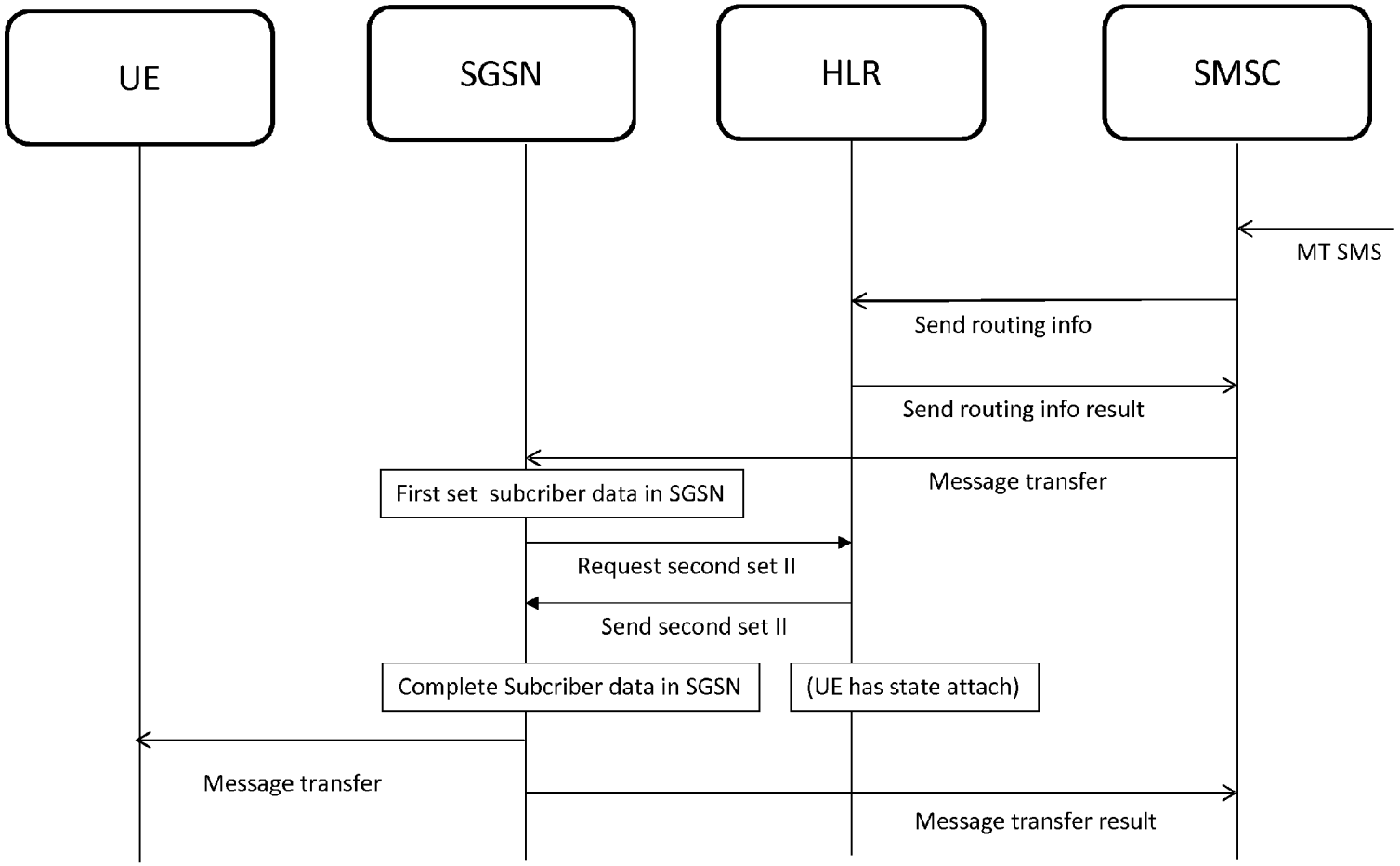

In an embodiment of the disclosed method, the SGSN does not contain sufficient subscriber data to establish a communication session with the UE 3 to transfer data. FIGS. 7B and 7C show embodiments to change the state of the SGSN from partial attach to full attach in case of a data availability indication. This requires interaction between the SGSN and the HLR to transfer the second set II of subscriber data to the SGSN. This interaction can be initiated by either the HLR or the SGSN.

In FIG. 7B, the HLR recognizes a sends routing info message as a trigger of a UE in state partially attach. The routing info changes the state of the UE in the HLR to "attach" and the HLR pushes the second set II of subscriber data to the SGSN (which may be followed by an acknowledgement back to the HLR). When the UE receives the SMS messages, it activates a PDP context, which is accepted by the SGSN now, as the SGSN has the complete subscriber data, as in FIG. 2B. It should be noted that the SMS message transfer can take place independent on the transmission and storage of the second set II of subscription data.

In FIG. 7C, the SGSN recognizes the SMS message transfer as a trigger of a UE 3 in state "partial attach". The SGSN requests the HLR to transfer the second set II of subscriber data and, in response, the HLR sends the second set II of subscriber data to the SGSN. It should be noted that the SMS message transfer from the SGSN to the UE can take place independent on the storage of the second set II of subscription data in the SGSN.

Figure 8:
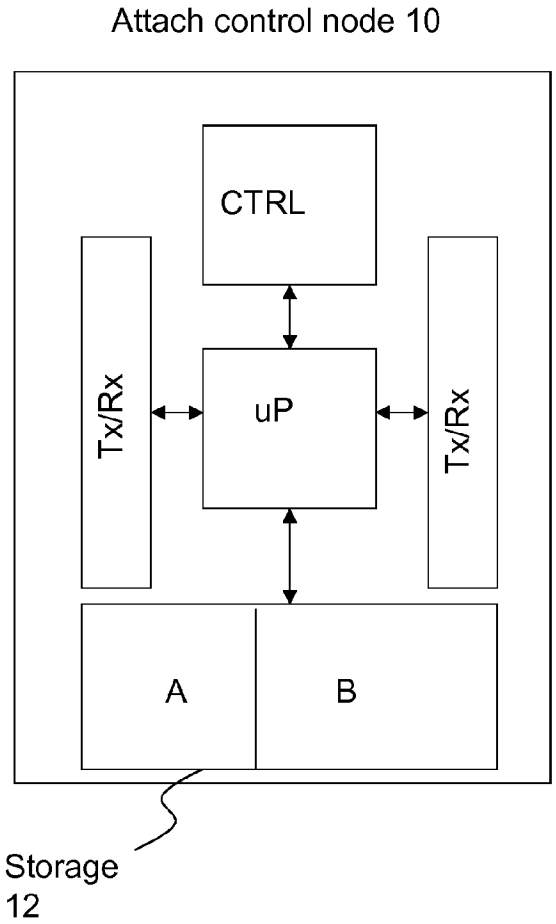
FIG. 8 is a schematic illustration of an attach control node containing a storage with a non-overwritable part A and an overwritable part B.

When network initiated communication for a UE 3 is rather frequent, the approach of FIG. 7B or 7C results in a considerable amount of interactions with the HLR. Alternatively, the complete subscriber data is stored in the storage 12 of the SGSN. The second set II of subscriber data in the storage 12 can be overwritten by other data (e.g. after a certain available resource threshold has been passed in the SGSN). The first set I of subscriber data cannot be overwritten as long as the UE 3 should be in a partial attach state. If the second set II of subscriber data is overwritten, the second set II of subscriber data should be retrieved from the HLR (of HSS) again when a PDP context should be established. FIG. 8 is a schematic illustration of an attach control node containing a storage 12 with a part A that cannot be overwritten (i.e. the part with the first set I of subscriber data) and a part B that can be overwritten, if required.

Alternative triggers than a data availability indication for transferring the second set of subscriber data to the SGSN have been contemplated. The second set II of subscription data may be desired at the attach control node 10 in response to a resource availability indication received from the attach control node 10 at the HLR indicating the availability of resources for containing the second set of subscription data in the attach control node. As an example, storage capacity may be available in the storage 12. In this case, a communication session may be established more quickly.

In yet another example, the second set II of subscription data may be transmitted to the attach control node 10 from the HLR at a predefined time or within a predefined time interval. This case is advantageous if information is available within the telecommunications system 1 when a UE 3 desires to establish a connection with the telecommunications system. Such information may e.g. be available from a contract between the operator of the telecommunications system and the operator of the user equipment. As an example, such a contract may determine the time at which or the time interval during which the UE 3 will or is allowed to transmit data.

After a period of time, the state for a UE 3 in the telecommunications system 1 may return from attach to partial attach again, for example but not limited to after the expiry of a timer, at the end of the communication session between the UE 3 and the telecommunications network, after a decrease of free resources in the attach control node or after intervention via network management.

Figure 9A:
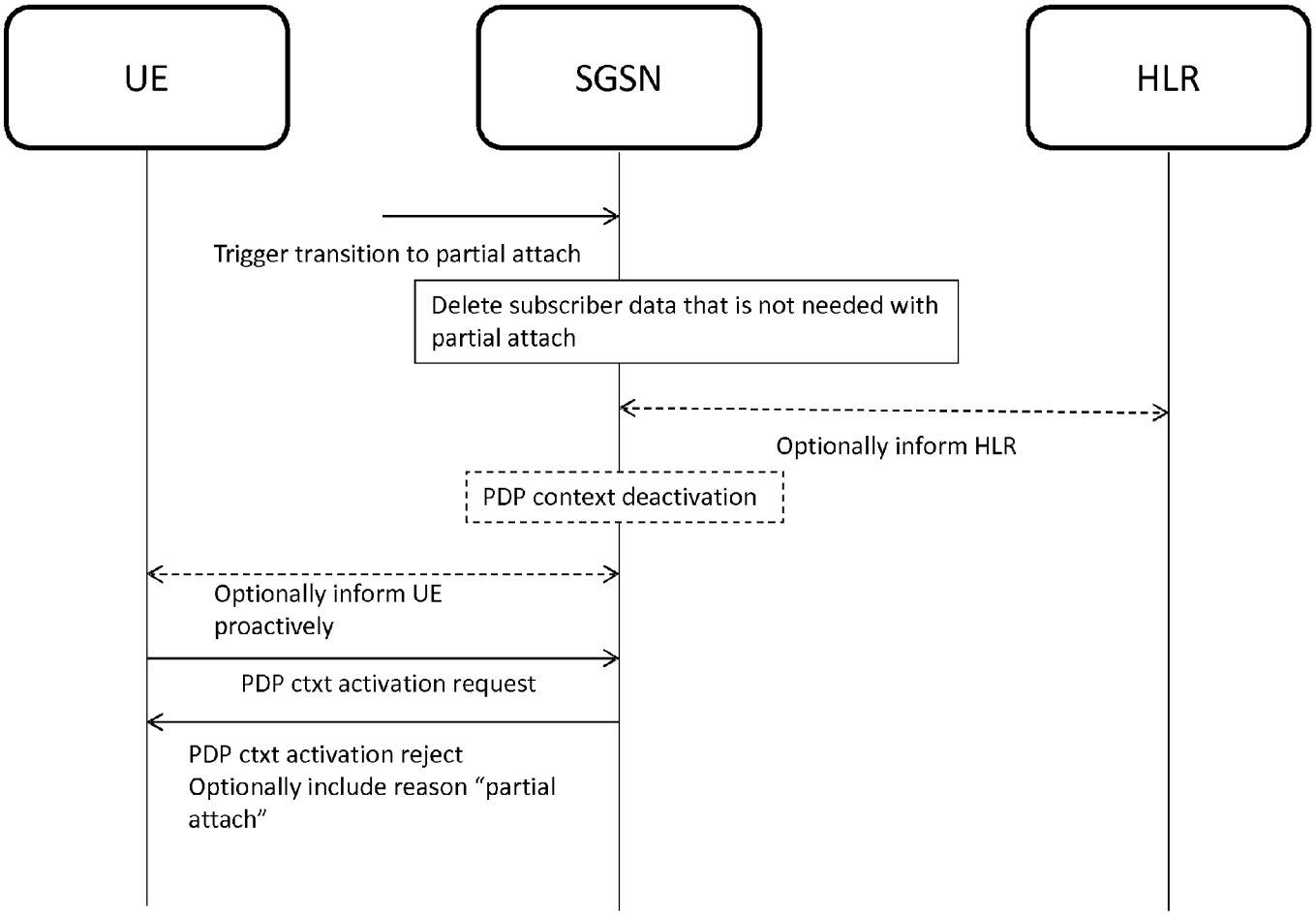
FIGS. 9A and 9B are sequence diagrams for a 2G/3G telecommunications system illustrating return to a partial detach state.
Figure 9B:
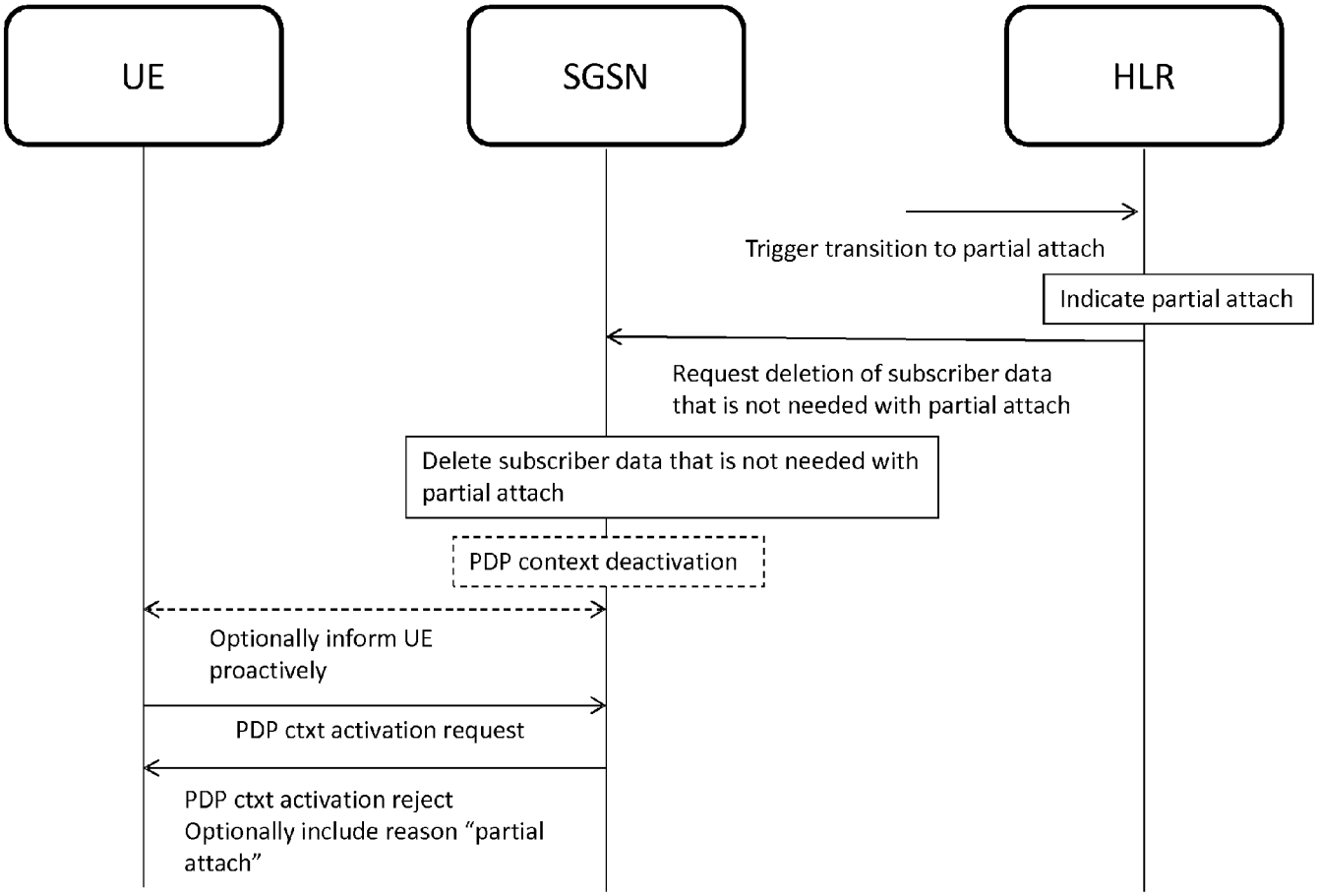

FIGS. 9A and 9B are sequence diagrams for a 2G/3G telecommunications system illustrating return from the full attach state to a partial attach state.

In FIG. 9A, the SGSN receives the trigger for a transition back to partial attach. The SGSN removes the subscriber data of the second set II that is not required for a partial attach from memory storage 12. When there are activated PDP contexts for the UE 3, the transition to partial attach results in a network initiated PDP context deactivation. Optionally, the SGSN informs the HLR, which changes the UE state in the HLR to partial detach. Optionally, the SGSN informs the UE 3 on the transition to partial attach. The SGSN can do this proactively in a separate message directly following the transition or in the PDP context deactivation, or reactively, in the reject of a PDP activation request by the UE.

In FIG. 9B, the HLR receives the trigger for a transition from full attach back to partial attach. The HLR changes the UE state to partial attach and requests the SGSN to delete the second set II of subscriber data that is not required for a partial attach. When there are activated PDP contexts for the UE, the transition back to partial attach results in a network initiated PDP context deactivation. Again, optionally, the SGSN informs the UE 3 on the transition to partial detach. The SGSN can do this proactively in a separate message directly following the transition or in the PDP context deactivation, or reactively, in the reject of a PDP activation request by the UE.

Figure 10A:
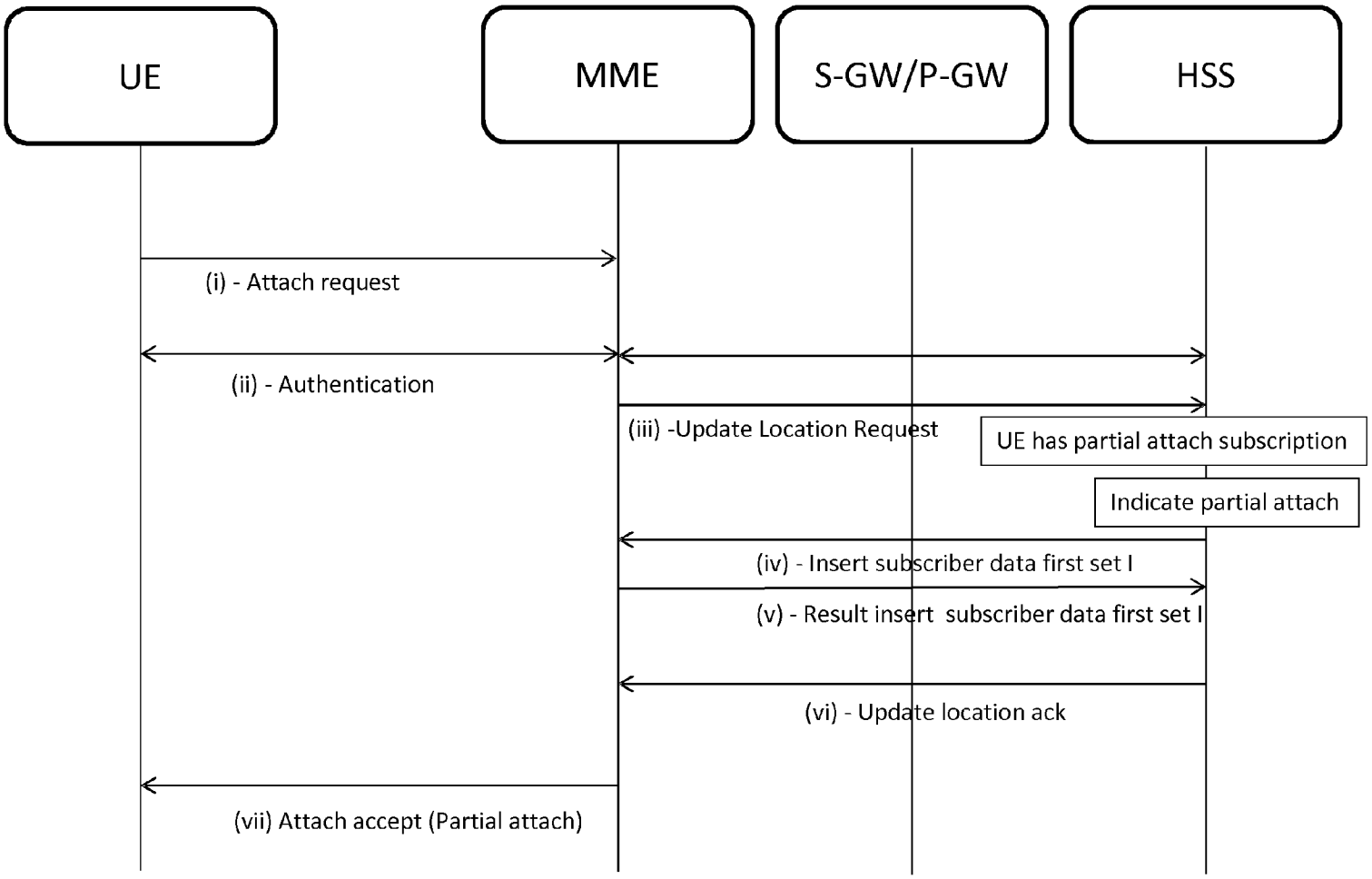
FIGS. 10A-10C are sequence diagrams for an LTE/EPS telecommunications system illustrating various embodiments of establishing a partial attach state for a UE.
Figure 10B:
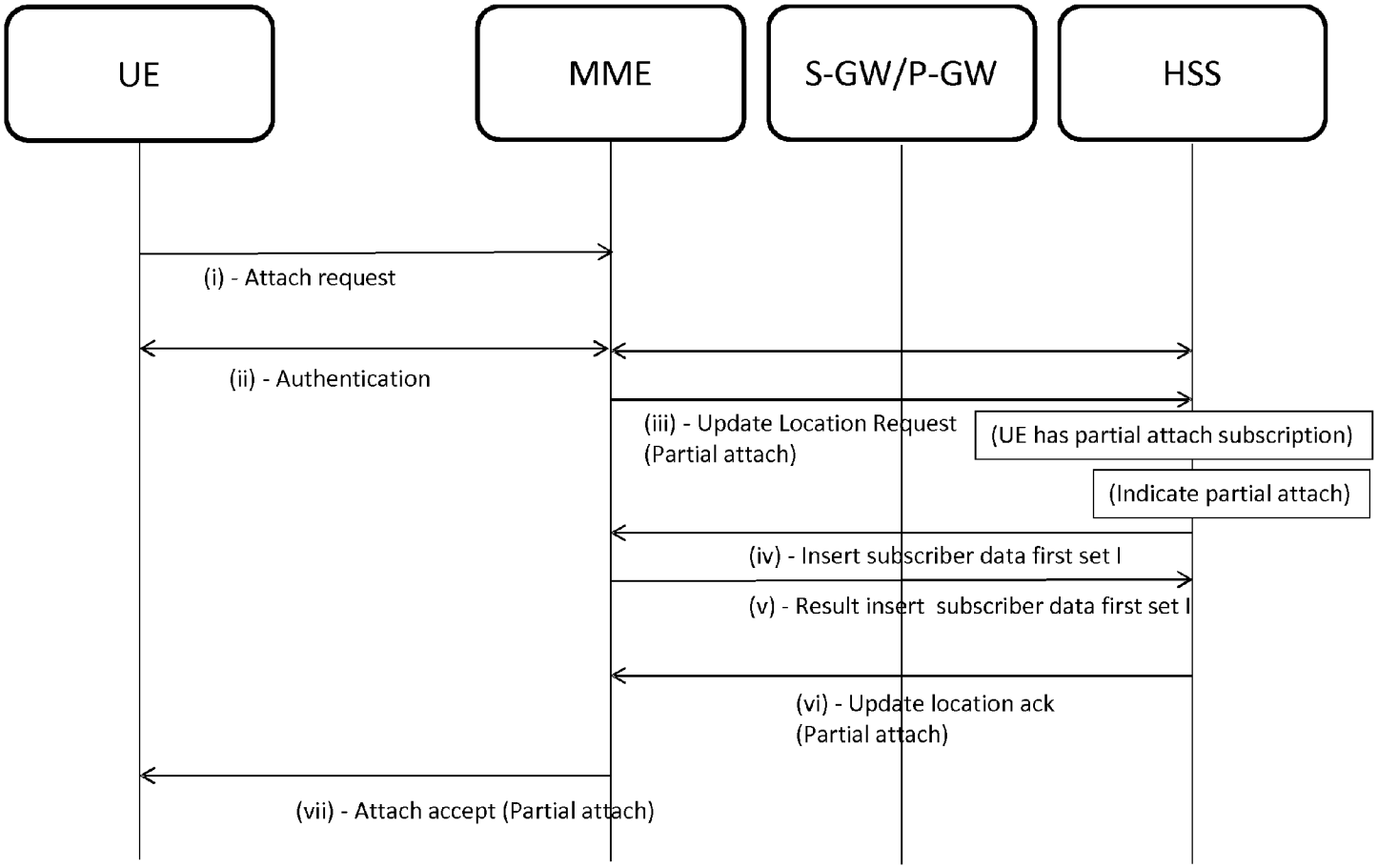
Figure 10C:
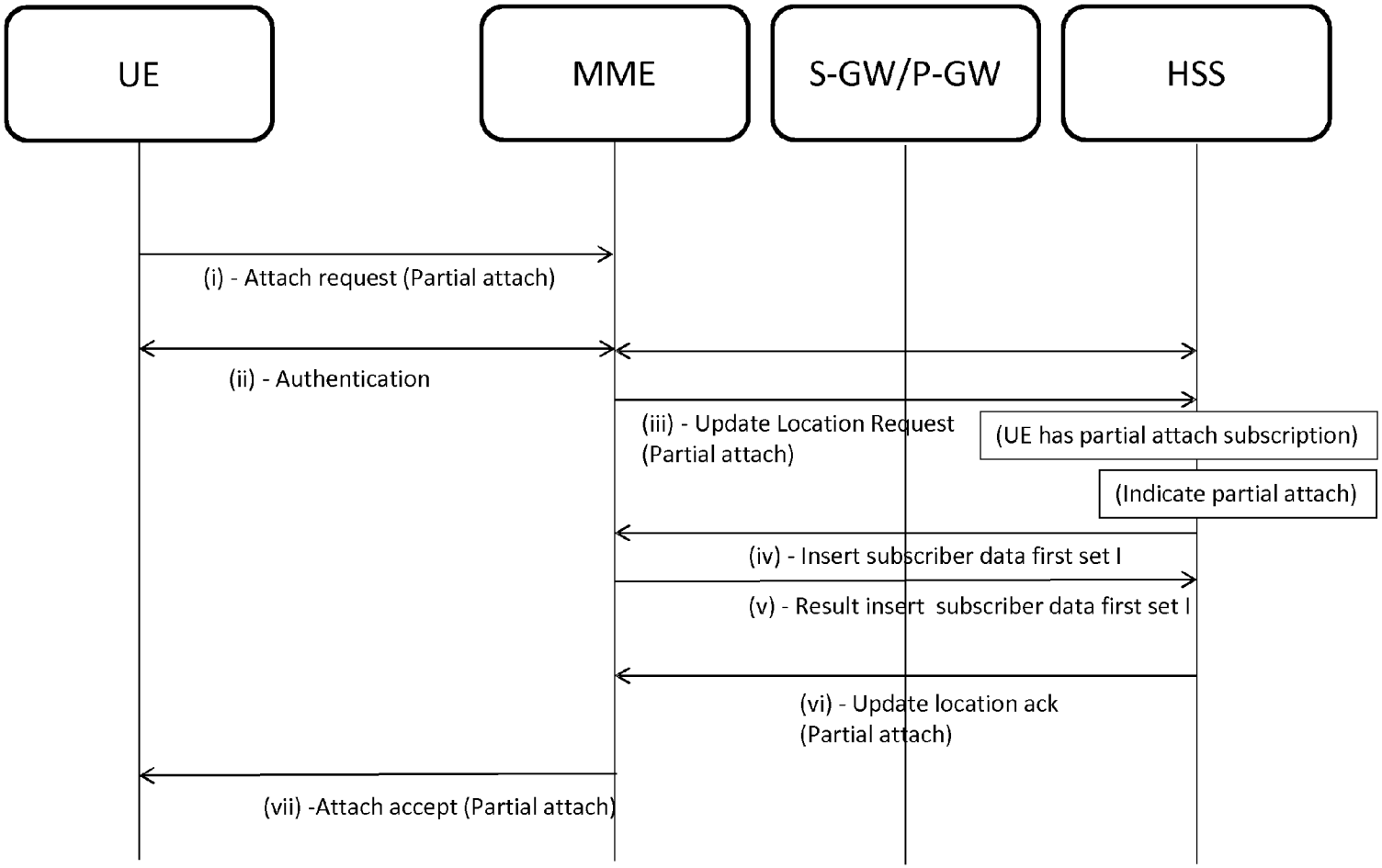

FIGS. 10A-10C are sequence diagrams for an LTE/EPS telecommunications system illustrating various embodiments of establishing a partial attach state for a UE 3. In each of the embodiments, a first set I of subscription data is transferred to the MME as opposed to the prior art case as depicted in FIG. 2C. The steps are similar to the steps of FIGS. 5A-5C, albeit between different entities MME (as an attach control node 10, instead of the SGSN) and the HSS (as a subscriber database system 11, instead of the HLR). As can be observed from the figures, steps (vi) and (vii) are configured to inform the UE 3 that only a partial attach has been established. In this manner, UE 3 is e.g. informed that no default bearer has been established. If the UE 3 itself has requested a partial attach, the UE 3 may already be aware of the partial attach and the confirmation from the telecommunications system 1 may be omitted. The method as described with reference to FIG. 5D can also be implemented for a LTE/EPS system.

Figure 11A:
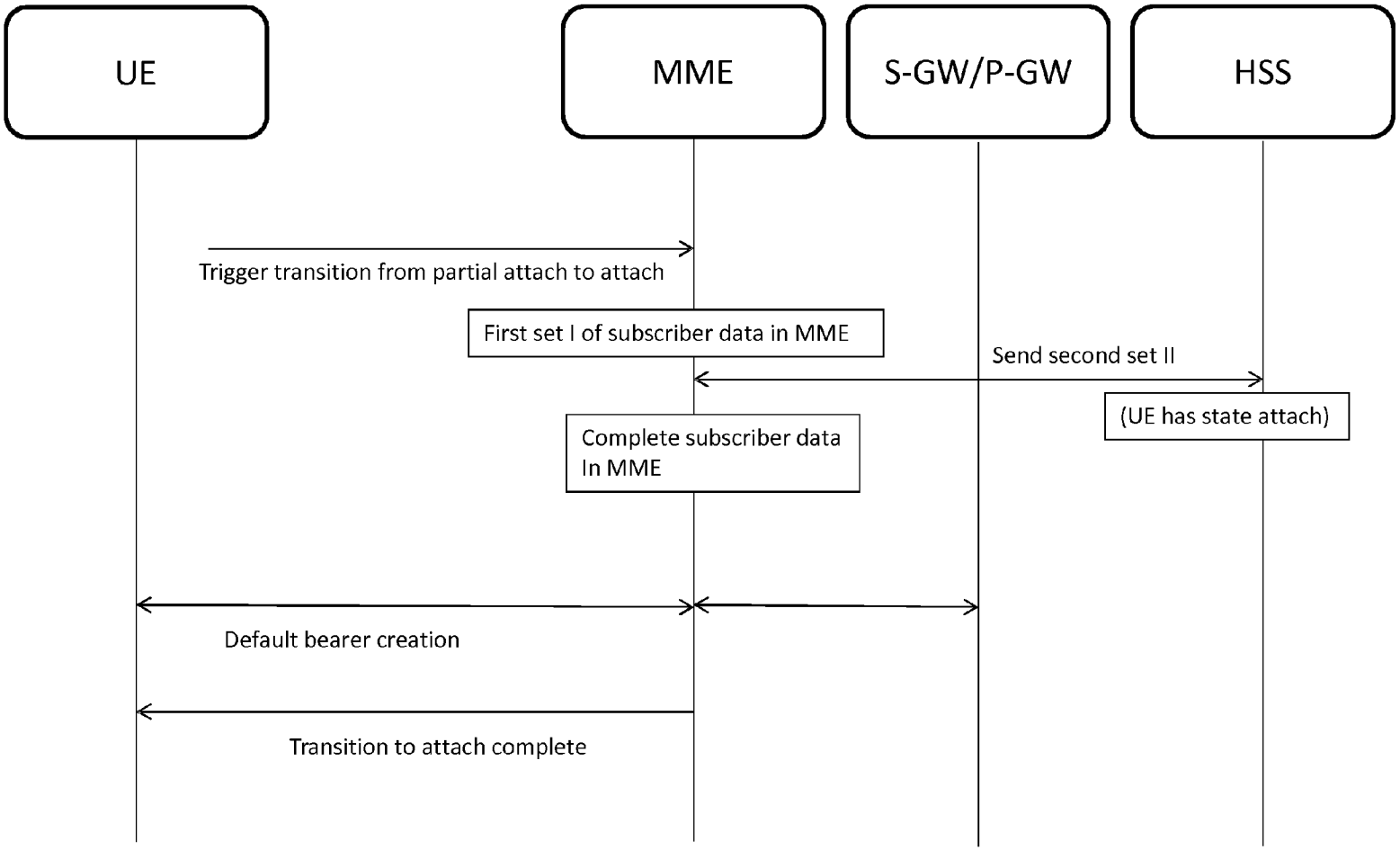
FIGS. 11A and 11B are sequence diagrams for an LTE/EPS telecommunications system illustrating embodiments for a transition from a partial attach to a complete attach state for a UE.
Figure 11B:
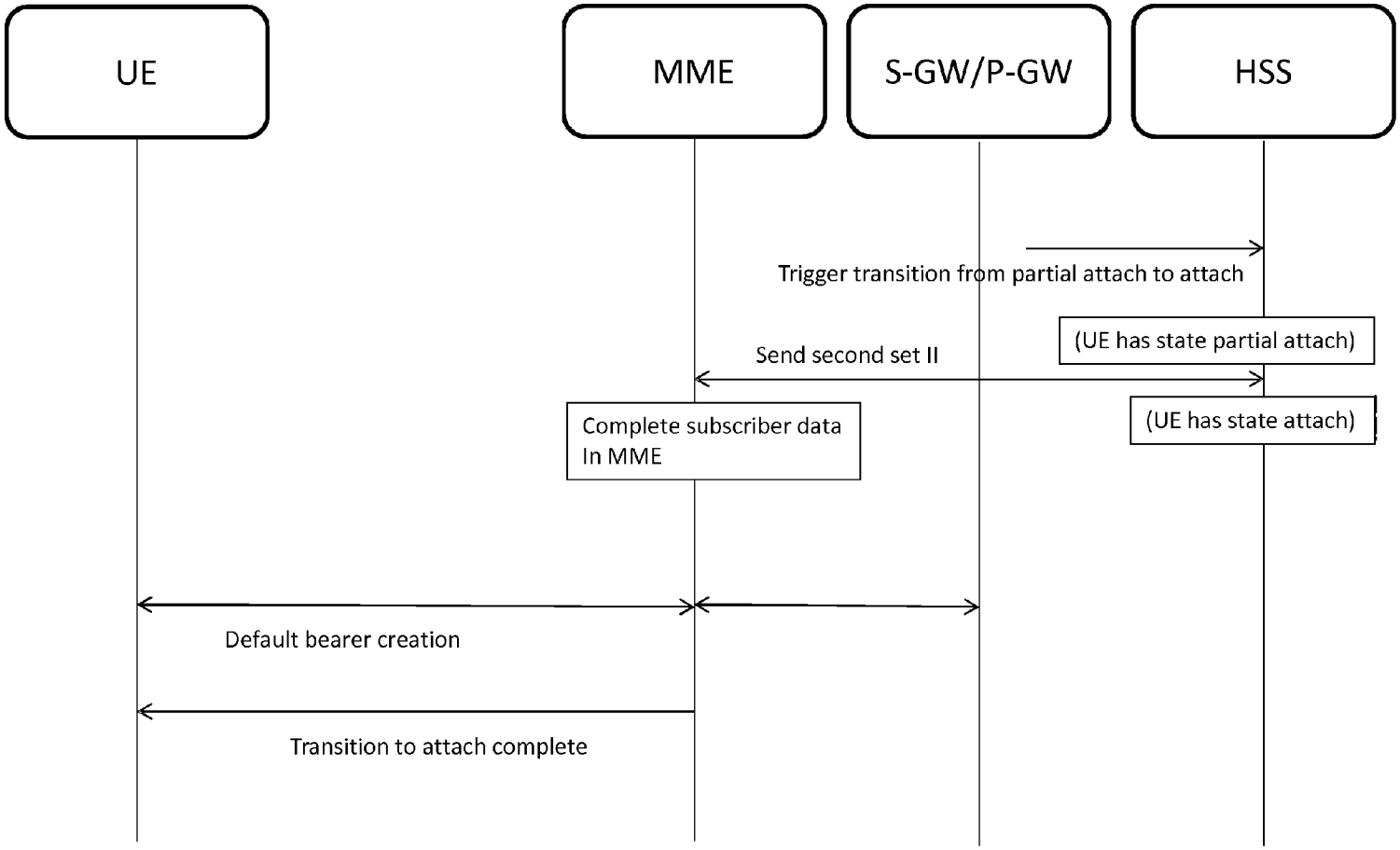

FIGS. 11A and 11B are sequence diagrams for an LTE/EPS telecommunications system illustrating embodiments for a transition from a partial attach to a complete attach state for a UE. With LTE the transition from partial attach to full attach comprises a transfer of the complete subscriber data together with the creation of a default bearer that is initiated from the MME explicitly instead of a normal default bearer creation that is created implicitly at the attach procedure. Alternatively, the MME sends a message to the UE, that instructs the UE to activate a default bearer. Exemplary implementations are shown in FIG. 11A (for the case with a trigger for a transition to attach that is received at the MME, similarly to a trigger to the SGSN as depicted in and described with reference to FIG. 7C) and in FIG. 11B (for the case with a trigger for a transition to attach that is received at the HSS, similarly to a trigger to the HLR as depicted in and described with reference to FIG. 7B). The message to inform the UE on the transition to attach may be combined with the default bearer creation signaling in some implementations.

Figure 12A:
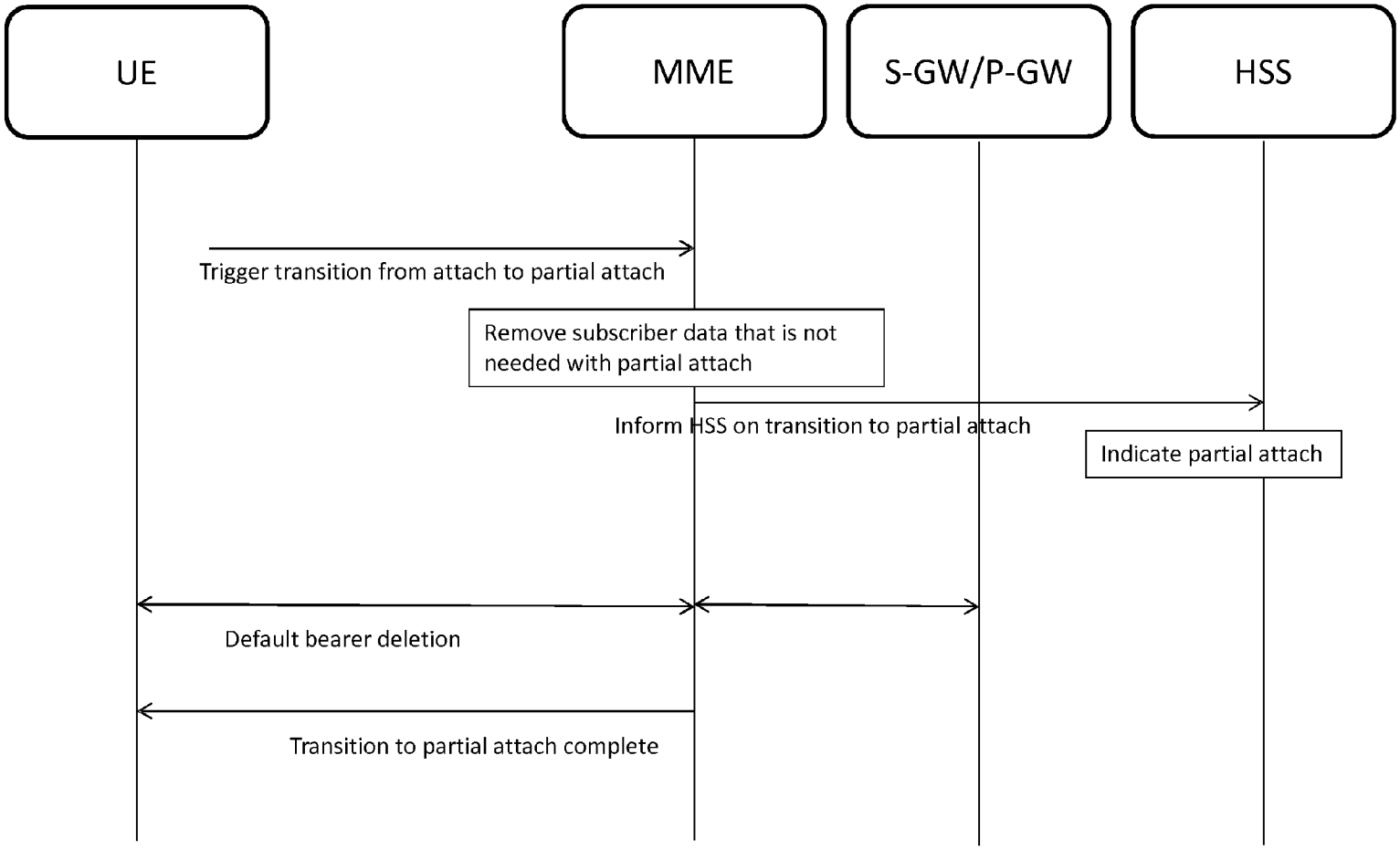
FIGS. 12A and 12B are sequence diagrams for an LTE/EPS telecommunications system illustrating embodiments for a transition from a complete attach state back to a partial attach state for a UE.
Figure 12B:
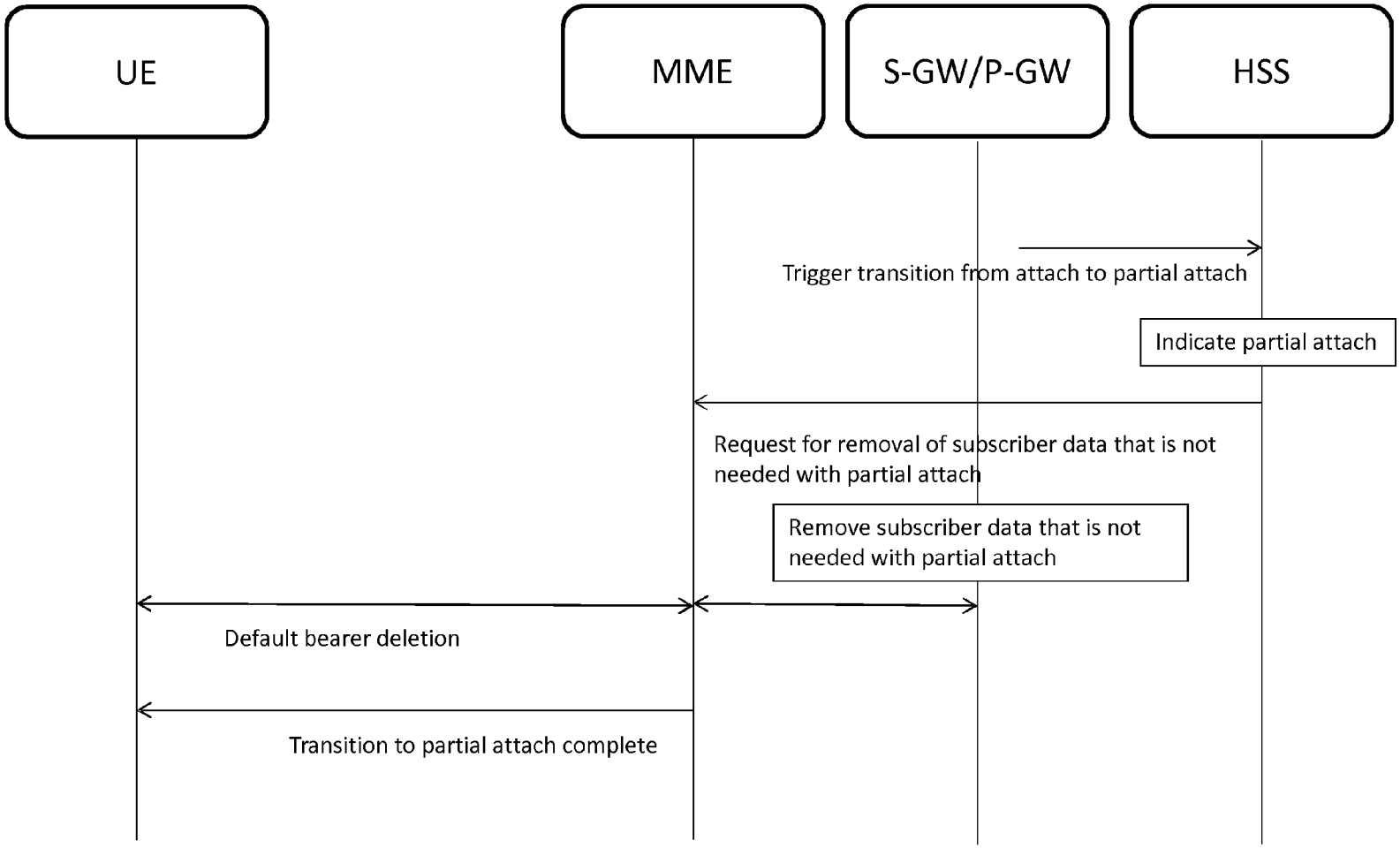

FIGS. 12A and 12B are sequence diagrams for an LTE/EPS telecommunications system illustrating embodiments for a transition from a complete attach state back to a partial attach state for a UE. In FIG. 12A, the MME is triggered for a transition back to the partial attach state (similarly to a trigger to the SGSN as depicted in and described with reference to FIG. 9A). In FIG. 12B, the HSS is triggered to return the UE to a partial attach state (similarly to a trigger to the HLR as depicted in and described with reference to FIG. 9B). In addition, the default bearer is removed when the UE 3 returns to the partial attach state.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

With some modifications, one skilled in the art may extend the embodiments described herein to other architectures, networks, or technologies.

Various embodiments of the invention may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

It is to be understood that any feature described in relation to any one embodiment may be used alone, or in combination with other features described, and may also be used in combination with one or more features of any other of the embodiments, or any combination of any other of the embodiments. Moreover, the invention is not limited to the embodiments described above, which may be varied within the scope of the accompanying claims.

The invention claimed is:

[1. A method for controlling an attach state of a user equipment in an attach control node of a telecommunications system further comprising a subscriber database containing subscription data of the user equipment, the method comprising:

receiving in a first transfer stage a first set of subscription data from the subscriber database and storing the first set of subscription data in the attach control node, wherein the first set of subscription data is insufficient for enabling establishing a communication session between the user equipment and the telecommunications system, and wherein, if an authentication step is required, authentication data are received in the attach control node prior to the receiving in the first transfer stage;

if establishing a communication session is required between the user equipment and the telecommunications network, receiving in a second transfer stage following the first transfer stage at least one second set of subscription data from the subscriber database in the attach control node, and storing the second set of subscription data in the attach control node, wherein a combination of the first set of subscription data and the second set of subscription data is sufficient for enabling establishing a communication session between the user equipment and the telecommunications network.]

[2. The method according to claim 1, wherein the first set of subscription data is free of communication session management subscription data and comprises the Network Access Mode parameter.]

[3. The method according to claim 1, wherein only the second set of the subscription data comprises communication session management subscription data.]

4. [The method according to claim 2,] *A method for controlling an attach state of a user equipment in an attach control node of a telecommunications system further comprising a subscriber database containing subscription data of the user equipment and a partial transfer indication that the user equipment has a partial attach subscription, the method comprising:*

*as a consequence of the subscriber database containing the indication that the user equipment has the partial attach subscription, receiving in a first transfer stage a first set of subscription data from the subscriber database and storing the first set of subscription data in the attach control node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system;*

*subsequent to receiving the first set of subscription data, receiving in a second transfer stage following the first transfer stage a second set of subscription data from the subscriber database in the attach control node, and storing the second set of subscription data in the attach control node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system;*

*wherein the first set of subscription data is free of communication session management subscription data and comprises a Network Access Mode parameter,* wherein the receiving and storage of the first set of subscription data comprises [one step selected from the group consisting of:]

transmitting a request from the attach control node to the subscriber database in response to receiving an attach request from the user equipment at the attach control node, and receiving only the first set of subscription data on the basis of [a] *the* partial transfer indication associated with the user equipment in the [subscription] *subscriber* database[; and transmitting a request from the attach control node to the subscriber database, the request containing a partial transfer indication].

5. A method for controlling an attach state of a user equipment in an attach control node of a telecommunications system further comprising a subscriber database containing subscription data of the user equipment *and a partial transfer indication that the user equipment has a partial attach subscription*, the method comprising:

*as a consequence of the subscriber database containing the indication that the user equipment has the partial attach subscription,* receiving in a first transfer stage a first set of subscription data from the subscriber database and storing the first set of subscription data in the attach control node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system;

subsequent to receiving the first set of subscription data, receiving in a second transfer stage following the first transfer stage a second set of subscription data from the subscriber database in the attach control node, and storing the second set of subscription data in the attach control node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system;

wherein the storage of the second set of subscription data is triggered by at least one of the following:

a data availability indication in the telecommunications system indicating the availability of user data for *transfer in a communication session to* the user equipment;

[a resource availability indication transmitted from the attach control node indicating the availability of resources for containing the second set of subscription data in the attach control node;]or expiration of a timer.

~~[6. The method according to claim 1, further comprising deleting from the combination of the first set of subscription data and the second set of subscription data the at least one second set of subscription data at the attach control node after a precondition has been fulfilled and, if the telecommunications system is an LTE telecommunications system, removing a default bearer for the user equipment.]~~

7. [The method according to claim 1,] *A method for controlling an attach state of a user equipment in an attach control node of a telecommunications system further comprising a subscriber database containing subscription data of the user equipment and a partial transfer indication that the user equipment has a partial attach subscription, the method comprising:*

*as a consequence of the subscriber database containing the indication that the user equipment has the partial attach subscription, receiving in a first transfer stage a first set of subscription data from the subscriber database and storing the first set of subscription data in the attach control node, wherein, as received, the first set of subscription data, being configured as a partial*

*subset of a complete set of subscription data that are required for enabling establishing a communication session between the user equipment and the telecommunications system, is insufficient for enabling establishing a communication session between the user equipment and the telecommunications system;*

*subsequent to receiving the first set of subscription data, receiving in a second transfer stage following the first transfer stage a second set of subscription data from the subscriber database in the attach control node, and storing the second set of subscription data in the attach control node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system;* wherein the telecommunications system comprises a Long Term Evolution (LTE) telecommunications system, and wherein the method further comprises:

omitting establishing a default bearer on a radio path between the user equipment and the LTE telecommunications system prior to initiation of the second transfer stage;

providing the user equipment with information indicative of non-establishment of the default bearer prior to the initiation of the second transfer stage; and establishing the default bearer upon or after initiation of the second transfer stage by the attach control node.

[~~8. A non-transitory computer-readable medium having instructions stored thereon that, upon execution by one or more processors of a telecommunications system comprising an attach control node and a subscriber database containing subscription data of a user equipment, cause the one or more processors to carry out operations including:~~

~~receiving in a first transfer stage a first set of subscription data from the subscriber database and storing the first set of subscription data in the attach control node, wherein the first set of subscription data is insufficient for enabling establishing a communication session between the user equipment and the telecommunications system, and wherein, if an authentication step is required, authentication data are received in the attach control node prior to the receiving in the first transfer stage;~~

~~if establishing a communication session is required between the user equipment and the telecommunications network, receiving in a second transfer stage following the first transfer stage at least one second set of subscription data from the subscriber database in the attach control node, and storing the second set of subscription data in the attach control node, wherein a combination of the first set of subscription data and the second set of subscription data is sufficient for enabling establishing a communication session between the user equipment and the telecommunications network.~~]

[~~9. A subscriber database system configured for use in a telecommunications system, wherein the telecommunications system comprises an attach control node, the subscriber database system comprising:~~

~~a subscriber database containing subscription data of a user equipment;~~

~~a processor having access to instructions that when executed cause the database system to carry out operations including:~~

~~in a first transfer stage, providing to the attach control node a first set of subscription data from the subscriber database, wherein the first set of subscription data is insufficient for enabling establishing a communication session between the user equipment and the telecommunications system, and wherein, if the attach control received authentication data in an authentication step, the first transfer stage is carried out following the authentication step;~~

~~if establishing a communication session is required between the user equipment and the telecommunications network, then in a second transfer stage following the first transfer stage, providing to the attach control node at least one second set of subscription data from the subscriber database, wherein a combination of the first set of subscription data and the second set of subscription data is sufficient for enabling establishing a communication session between the user equipment and the telecommunications network.~~]

[~~10. A telecommunications node configured for use in a telecommunications system, wherein the telecommunications system comprises a subscriber database containing subscription data of a user equipment, the telecommunications node comprising:~~

~~a processor having access to instructions that when executed cause the telecommunications node to carry out operations including:~~

~~receiving in a first transfer stage a first set of subscription data from the subscriber database and storing the first set of subscription data in the telecommunications node, wherein the first set of subscription data is insufficient for enabling establishing a communication session between the user equipment and the telecommunications system, and wherein, if an authentication step is required, authentication data are received in the telecommunications node prior to the receiving in the first transfer stage;~~

~~if establishing a communication session is required between the user equipment and the telecommunications network, receiving in a second transfer stage following the first transfer stage at least one second set of subscription data from the subscriber database, and storing the second set of subscription data in the telecommunications node, wherein a combination of the first set of subscription data and the second set of subscription data is sufficient for enabling establishing a communication session between the user equipment and the telecommunications network.~~]

[11. The telecommunications node according to claim 10, wherein the first set of subscription data is free of communication session management subscription data and comprises the Network Access Mode parameter and wherein the second set of the subscription data comprises communication session management subscription data.]

12. [The telecommunications node according to claim 11.] *A telecommunications node configured for use in a telecommunications system, wherein the telecommunications system comprises a subscriber database containing subscription data of a user equipment and an indication that the user equipment has a partial attach subscription, the telecommunications node comprising:*

*a processor having access to instructions that when executed cause the telecommunications node to carry out operations including:*

*as a consequence of the subscriber database containing the indication that the user equipment has the partial attach subscription, receiving in a first transfer stage*

*only a first set of subscription data from the subscriber database and storing the first set of subscription data in the telecommunications node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system, and wherein;*

*if establishing a communication session is required between the user equipment and the telecommunications system, subsequent to receiving the first set of subscription data, receiving in a second transfer stage following the first transfer stage a second set of subscription data from the subscriber database, and storing the second set of subscription data in the telecommunications node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*if an authentication step is required, receiving authentication data prior to the receiving in the first transfer stage,*

*wherein the first set of subscription data is free of communication session management subscription data and comprises a Network Access Mode parameter and wherein the second set of the subscription data comprises communication session management subscription data,* wherein receiving and storing the first set of subscription data comprises:

transmitting a request from the telecommunications node to the subscriber database in response to receiving an attach request from the user equipment at the telecommunications node, and receiving only the first set of subscription data on the basis of the indication associated with the user equipment in the [subscription] *subscriber* database.

13. [The telecommunications node according to claim 10.] *A telecommunications node configured for use in a telecommunications system, wherein the telecommunications system comprises a subscriber database containing subscription data of a user equipment and an indication that the user equipment has a partial attach subscription, the telecommunications node comprising:*

*a processor having access to instructions that when executed cause the telecommunications node to carry out operations including:*

*as a consequence of the subscriber database containing the indication that the user equipment has the partial attach subscription, receiving in a first transfer stage only a first set of subscription data from the subscriber database and storing the first set of subscription data in the telecommunications node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system, and wherein:*

*if establishing a communication session is required between the user equipment and the telecommunications system, subsequent to receiving the first set of subscription data, receiving in a second transfer stage following the first transfer stage a second set of subscription data from the subscriber database, and storing the second set of subscription data in the telecommunications node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*if an authentication step is required, receiving authentication data prior to the receiving in the first transfer stage,* wherein storing the second set of subscription data is triggered by at least one of the following:

a data availability indication in the telecommunications system indicating the availability of user data for the user equipment;

[a resource availability indication transmitted from the telecommunications node indicating the availability of resources for containing the second set of subscription data in the telecommunications node;] or expiration of a timer.

~~[14. The telecommunications node according to claim 10, wherein the telecommunications node is further configured for deleting from the combination of the first set of subscription data and the second set of subscription data the at least one second set of subscription data at the telecommunications node after a precondition has been fulfilled and, if the telecommunications system is an LTE telecommunications system, removing a default bearer for the user equipment.]~~

15. [The telecommunications node according to claim 10.] *A telecommunications node configured for use in a telecommunications system, wherein the telecommunications system comprises a subscriber database containing subscription data of a user equipment and an indication that the user equipment has a partial attach subscription, the telecommunications node comprising:*

*a processor having access to instructions that when executed cause the telecommunications node to carry out operations including:*

*as a consequence of the subscriber database containing the indication that the user equipment has the partial attach subscription, receiving in a first transfer stage only a first set of subscription data from the subscriber database and storing the first set of subscription data in the telecommunications node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system, and wherein:*

*if establishing a communication session is required between the user equipment and the telecommunications system, subsequent to receiving the first set of*

*subscription data, receiving in a second transfer stage following the first transfer stage a second set of subscription data from the subscriber database, and storing the second set of subscription data in the telecommunications node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*if an authentication step is required, receiving authentication data prior to the receiving in the first transfer stage,* wherein the telecommunications system comprises a Long term Evolution (LTE) telecommunication system and the telecommunications node comprises an LTE telecommunications node, and wherein the operations further include:

omitting establishing a default bearer on a radio path between the user equipment and the LTE telecommunications system prior to initiation of the second transfer stage;

providing the user equipment with information indicative of non-establishment of the default bearer prior to the initiation of the second transfer stage;

establishing the default bearer upon or after initiation of the second transfer stage by the attach control node.

16. A user equipment configured for use with a telecommunications node of a telecommunications system, wherein the telecommunications system comprises a subscriber database containing subscription data of the user equipment, wherein the telecommunications node is configured to: (i) receive in a first transfer stage a first set of subscription data from the subscriber database and store the first set of subscription data in the telecommunications node, wherein the first set of subscription data is insufficient for enabling establishing a communication session between the user equipment and the telecommunications system; and (ii) if establishing a communication session is required between the user equipment and the telecommunications network, receive in a second transfer stage following the first transfer stage at least one second set of subscription data from the subscriber database, and store the second set of subscription data in the telecommunications node, wherein a combination of the first set of subscription data and the second set of subscription data is sufficient for enabling establishing a communication session between the user equipment and the telecommunications network and wherein the user equipment comprises:

a processor having access to instructions that when executed cause the user equipment to carry out operations including:

receiving and processing at least one of:

a partial subscription data transfer indication indicative of storing only the first set of subscription data in the telecommunications node; or if the user equipment is an LTE type user equipment, a non-bearer establishment indication indicative of omitting establishment of a default bearer on a radio path between the LTE type user equipment and the telecommunications node prior to initiation of the second transfer stage being insufficient for enabling establishment.

17. The user equipment according to claim 16, wherein the operations further include omitting requesting a communication session with the telecommunications node when having processed at least one of the partial subscription data transfer indication and the non-bearer establishment indication.

[18. The method of claim 1, wherein authentication of the user equipment is required, and wherein the method further comprises receiving authentication data in the attach control node prior to receiving the first set of subscription data in the first transfer stage.]

[19. The method of claim 6, wherein the telecommunications system is a Long Term Evolution telecommunications system, and wherein the method further comprises removing a default bearer for the user equipment.]

*20. A method for controlling an attach state of a user equipment in an attach control node of a telecommunications system further comprising a subscriber database containing subscription data of the user equipment and an indication that the user equipment has a partial attach subscription, the method comprising:*

*as a consequence of the subscriber database containing the indication that the user equipment has the partial attach subscription, receiving in a first transfer stage only a first set of subscription data from the subscriber database and storing the first set of subscription data in the attach control node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system;*

*subsequent to receiving the first set of subscription data, receiving in a second transfer stage following the first transfer stage a second set of subscription data from the subscriber database in the attach control node, and storing the second set of subscription data in the attach control node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*deleting from the combination of the first set of subscription data and the second set of subscription data the second set of subscription data at the attach control node after a precondition has been fulfilled.*

*21. The method of claim 20, wherein the telecommunications system is a Long Term Evolution telecommunications system, and wherein the method further comprises removing a default bearer for the user equipment.*

*22. A non-transitory computer-readable medium having instructions stored thereon that, upon execution by one or more processors of an attach control node of a telecommunications system comprising the attach control node and a subscriber database containing subscription data of a user equipment and an indication that the user equipment has a partial attach subscription, cause the attach control node to carry out operations including:*

*as a consequence of the subscriber database containing the indication that the user equipment has the partial attach subscription, receiving in a first transfer stage only a first set of subscription data from the subscriber*

*database and storing the first set of subscription data in the attach control node, wherein, as received, the first set of subscription data, being configured as a partial subset of a complete set of subscription data that are required for enabling establishing a communication session between the user equipment and the telecommunications system, is insufficient for enabling establishing a communications session between the user equipment and the telecommunications system;*

*if establishing a communication session is required between the user equipment and the telecommunication system, subsequent to receiving the first set of subscription data, receiving in a second transfer stage following the first transfer stage a second set of subscription data from the subscriber database in the attach control node, and storing the second set of subscription data in the attach control node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*if an authentication step is required, receiving authentication data in the attach control node prior to the receiving in the first transfer stage.*

*23. A subscriber database system configured for use in a telecommunications system, wherein the telecommunications system comprises an attach control node, the subscriber database system comprising:*

*a subscriber database containing subscription data of a user equipment and an indication that the user equipment has a partial attach subscription;*

*a processor having access to instructions that when executed cause the database system to carry out operations including:*

*as a consequence of the subscriber database containing the indication that the user equipment has the partial attach subscription, in a first transfer stage, providing to the attach control node only a first set of subscription data from the subscriber database, wherein, as provided, the first set of subscription data, being configured as a partial subset of a complete set of subscription data that are required for enabling establishing a communication session between the user equipment and the telecommunications system, is insufficient for enabling establishing a communication session between the user equipment and the telecommunications system,*

*if establishing a communication session is required between the user equipment and the telecommunications system, subsequent to providing the first set of subscription data, then in a second transfer stage following the first transfer stage, providing to the attach control node a second set of subscription data from the subscriber database, wherein, as provided, the second set of subscription data is configured to be an additional partial subset of the complete set of subscription data that in combination with the first set of subscription data is the complete set of subscription data that is sufficient for enabling establishing a communication session between the user equipment and the telecommunications system, and*

*wherein, if the attach control node has received authentication data in an authentication step, the first transfer stage is carried out following the authentication step.*

*24. A telecommunications node configured for use in a telecommunications system, wherein the telecommunications system comprises a subscriber database containing subscription data of a user equipment and an indication that the user equipment has a partial attach subscription, the telecommunications node comprising:*

*a processor having access to instructions that when executed cause the telecommunications node to carry out operations including:*

*as a consequence of the subscriber database containing the indication that the user equipment has the partial attach subscription, receiving in a first transfer stage only a first set of subscription data from the subscriber database and storing the first set of subscription data in the telecommunications node, wherein, as received, the first set of subscription data, being configured as a partial subset of a complete set of subscription data that are required for enabling establishing a communication session between the user equipment and the telecommunications system, is insufficient for enabling establishing a communication session between the user equipment and the telecommunications system, and wherein;*

*if establishing a communication session is required between the user equipment and the telecommunications system, subsequent to receiving the first set of subscription data, receiving in a second transfer stage following the first transfer stage a second set of subscription data from the subscriber database, and storing the second set of subscription data in the telecommunications node, wherein, as received, the second set of subscription data is configured to be an additional partial subset of the complete set of subscription data that in combination with the first set of subscription data is the complete set of subscription data that is sufficient for enabling establishing a communication session between the user equipment and the telecommunications system; and*

*if an authentication step is required, receiving authentication data prior to the receiving in the first transfer stage.*

*25. The telecommunications node of claim 24, wherein storing the second set of subscription data is triggered by at least one of the following:*

*a data availability indication in the telecommunications system indicating the availability of user data for the user equipment;*

*a resource availability indication transmitted from the telecommunications node indicating the availability of resources for containing the second set of subscription data in the telecommunications node; or*

*expiration of a timer.*

* * * * *